United States Patent Office 2,780,532
Patented Feb. 5, 1957

2,780,532

URANIUM SEPARATION PROCESS

Raymond M. Hainer, Revere, Mass., and Ernest Charles Evers, Philadelphia, Pa., assignors to the United States of America as represented by the United States Atomic Energy Commission No Drawing. Application August 13, 1948,
Serial No. 44,232

7 Claims. (Cl. 23—312)

This invention relates to a uranium separation process and more particularly to methods for separating hexavalent uranium from aqueous solutions containing uranium and other metals. These separation processes involve the use of a dialkyl ether of a polyethylene glycol as an extraction agent for the uranium, the use of an inorganic nitrate as a salting out agent for enhancing the amount of uranium extracted by the ether, and the use of water or aqueous ammonium sulfate solutions to strip the uranium from its ether solution.

The uranium separation process of the present invention is particularly adapted to the problem of separating uranium from aqueous solutions which also contain iron, chromium, nickel, and/or copper. Such solutions containing uranium and these other metals arise from uranium recovery processes wherein an acid, such as nitric, is used to wash traces of uranium out of iron, nickel, stainless steel or copper apparatus and concomitantly dissolves portions of the apparatus. The separation process of the present invention is also capable of separating uranium from aqueous solutions which may contain dissolved calcium, zinc or aluminum salts. This is important because of the fact that the nitrates of calcium, zinc and aluminum are frequently used as salting out agents in carrying out the process of the present invention.

Essentially, the process of the present invention involves the use of a dialkyl ether of a polyethylene glycol to extract uranyl nitrate from an aqueous solution in which the predominant anion is the nitrate ion. Other anions, such as chloride, fluoride, or sulfate, may be also present in the solution, but the predominant anion is the nitrate ion which is present in large amounts in the aqueous solutions being extracted by virtue of the use of fairly large quantities of inorganic nitrates as salting out agents in these solutions.

The separation process of the present invention is predicated upon the discovery that in the presence of salting out agents dialkyl ethers of polyethylene glycols readily extract uranyl nitrate from an aqueous solution but that salts of other elements such as iron, nickel, chromium, copper, calcium, zinc and aluminum remain in the aqueous phase during and after extraction. When enough salting out agent is used to obtain a distribution coefficient (ether/water) for uranium of about 200, the distribution coefficient (ether/water) for other salts such as iron usually is not greater than 0.01. Hence, most of the uranium goes into the organic phase and most of the other elements stay in the aqueous phase upon extraction.

Most of the nitrates of the elements encountered in extraction from aqueous solutions containing hexavalent uranium are virtually insoluble in the dialkyl ethers of polyethylene glycols which are employed as extraction solvents. However, iron nitrate is slightly soluble in these polyether extraction agents, and if too much is extracted, this element may complicate subsequent operations. It is easily possible to manage the extraction operations so that a minimum of iron will be extracted. Contamination with iron may be reduced in practice by employing a system with a minimum value for the uranium coefficient consistent with complete extraction of uranium. For instance, by using an extraction technique involving a selection of polyether solvent and salting out agent to attain a uranium extraction coefficient (ether/water) of about 200, it is possible to substantially eliminate iron contamination of uranium in the ether extract. The factors which increase the uranium distribution coefficient (ether/water) also increase the iron distribution coefficient (ether/water) in like ratio. Therefore, since substantially all of the uranium goes into the polyether phase and most of the iron stays in the aqueous phase, it is not desirable to modify the conditions which increase the uranium distribution coefficient (ether/water) when such an increase will not materially increase the amount of uranium extracted and the modified conditions will result in the appearance of substantial quantities of iron in the polyether extract. To illustrate this statement, if conditions are modified so that the distribution coefficient (ether/water) for $UO_2(NO_3)_2$ is increased from 200 to 2400, it is found that the amount of uranium extracted is not materially increased but that the amount of iron extracted by the polyether increases by as much as tenfold. The use of ferric nitrate as a salting out agent is to be avoided if it is desired to minimize the amount of iron that distributes into the ether phase. The chloride ion concentration should also be kept low if it is desired to keep to a minimum the amount of iron that goes into the polyether phase. Chloride ion may be removed from solution by adding lead nitrate thereto whereby lead chloride is precipitated.

Aside from its application to analytical procedures, extraction with polyethers may be employed in practice to recover uranyl nitrate in a relatively pure state from solutions containing a wide variety of salts, whose presence renders purely chemical means of separation very difficult or often impossible. Such impurities as iron or chromium, for example, are particularly difficult to separate from uranium by chemical means, particularly when a quantitative recovery of the uranium is required.

While diethyl ether may be used as a solvent for extracting uranyl nitrate ($UO_2(NO_3)_2$) from aqueous solutions thereof, its use as an extraction solvent is disadvantageous for several reasons. The distribution coefficient for uranyl nitrate; i. e., the ratio of its concentration in the ether phase to its concentration in the water phase is fairly low under most conditions. Diethyl ether is a low boiling, highly inflammable liquid whose use often presents a considerable hazard. Except under special circumstances, diethyl ether does not appear adaptable to large scale operations both because of the potential hazards involved and because rather large amounts of salting out agents must be employed to partition the uranyl nitrate into the ether phase.

It was found that the diethyl ether of ethylene glycol was too soluble in water to be a useful extraction agent in the present invention. The dibutyl ether of ethylene glycol was found to be a poorer extraction agent for uranyl nitrate than diethyl ether. The discovery that dialkyl ethers of polyethylene glycols were efficient extraction agents for separating hexavalent uranium from aqueous solutions was therefore rather surprising, since it might be expected from the results obtained with the dialkyl ethers of ethylene glycol that all polyethers were less efficient extraction agents than monoethers.

The most effective extraction solvents for uranium used in the present invention were the dibutyl ethers of polyethylene glycols and in particular the dibutyl ethers of diethylene glycol, triethylene glycol and tetraethylene glycol. The dibutyl ether of diethylene glycol was found to be the most satisfactory for large scale operations because this polyether is not only readily available but it possesses the advantages of low-volatility, high flash point, low mutual solubility with water and it is a powerful and flexible extraction agent. The dibutyl ether of tetraethylene glycol, $C_4H_9(OC_2H_4)_4OC_4H_9$, was found to be an even more powerful extraction agent that the dibutyl ether of diethylene glycol, but because of its higher price this ether was used mainly for special purposes, such as analytical procedures and operations where only a limited quantity of extraction solvent is used and a low concentration of salting out agent is desirable. The dibutyl ether of triethylene glycol appeared to be substantially as good an extraction agent as the dibutyl ether of tetraethylene glycol but it was more expensive.

The dibutyl ether of diethylene glycol may also be called dibutoxydiethylene glycol, and the dibutyl ether of tetraethylene glycol may be designated as dibutoxytetraethylene glycol.

An object of this invention is to use extraction solvents for uranium which are more advantageous than diethyl ether. A further object is to provide a non-hazardous extraction process suitable for large scale operation whereby uranium may be separated quantitatively and in a relatively pure state from solutions which contain a wide variety of other metal ions. A still further object of the invention is to employ suitable salting out agents to enhance the efficiency of the extraction process. Another object of the invention is to provide special techniques for specific purposes, such as for separating uranium from solution containing such ions as fluoride and sulfate which normally interfere with extraction. Still another object of the invention is to provide an extraction procedure for determining the uranium content of aqueous solutions. Other objects will appear hereinafter.

These objects are accomplished in accordance with the preferred embodiments of the present invention by adding to an aqeuous solution containing the uranyl ion a salting out agent such as ammonium nitrate or a nitrate of a divalent or trivalent metal such as calcium, zinc, copper, aluminum or iron and then extracting said aqueous solution with a dibutyl ether of a polyethylene glycol having the general formula

$$C_4H_9(O-CH_2-CH_2)_n-OC_4H_9$$

where $n$ stands for one of the numbers 2, 3 or 4. The uranium is stripped from the polyether solution of uranyl nitrate thus obtained by means of water, water containing a dissolved base or an aqueous ammonium sulfate solution. The acidity of the aqueous phase being extracted is carefully controlled so that no hydrolyzable salt such as ferric nitrate will be converted into its hydroxide which precipitates. The acidity of the polyether phase containing uranyl nitrate is also carefully checked so that it will not be so great as to interfere with the back washing or stripping of uranyl nitrate therefrom by means of an aqueous phase. If desired, the polyether phase containing uranyl nitrate may be washed with concentrated aqueous solutions of metal nitrates to remove traces of iron therefrom.

The invention will first be illustrated by a discussion of batchwise extraction processes for recovering uranyl nitrate from aqueous solutions containing the uranyl ion and ions of various metals and will then be illustrated by describing analytical procedures for the determination of uranium which make use of the extraction techniques of the present invention.

Batchwise extraction processes for recovering uranyl nitrate

Batchwise extraction processes carried out in accordance with the present invention under properly controlled conditions are capable of separating $UO_2(NO_3)_2$ from solutions containing many of other different anions and cations. The main factors which should be considered in carrying out these batchwise extraction processes are:

(1) Concentration of salting out agents, which determines the partition coefficient of the $UO_2(NO_3)_2$, and (2) The amount of acid extracted by the polyether phase, which influences the wash-back of $UO_2(NO_3)_2$ into water and the stability of the aqueous solution from which the $UO_2(NO_3)_2$ is being extracted.

Control of the salting out power of the aqueous solution from which the $UO_2(NO_3)_2$ is to be extracted is one of the most important factors to consider in extraction. Ordinarily, a distribution coefficient (ether/water) for $UO_2(NO_3)_2$ of at least 100 is recommended for batch extraction. With such a coefficient, three passes with an equal volume of polyether should reduce the uranium concentration by a factor of $10^6$. Thus, with a 5% solution of uranium, which is about the upper limit met with in practice, the thrice extracted aqueous solution should contain no more than 0.05 mg. of U per liter, or 5 parts per 100,000,000 parts of solution. In our work, employing an apparatus and a procedure designed to eliminate hold-up, the uranium content after three passes with an equal volume of polyether averaged a few parts per 100,000,000 parts of solution when the value for the distribution coefficient (ether/water) of $UO_2(NO_3)_2$ was approximately 200.

Described below in Examples I, II and III are three series of batch extractions carried out upon three aqueous solutions of different compositions which contain uranyl nitrate and in which the value of the distribution coefficient (ether/water) for $UO_2(NO_3)_2$ is approximately 200 to 250.

EXAMPLE I 10 liters of an aqueous solution which contained 5 g. of U (added as $UO_2(NO_3)_2$), 22 g. of $Fe(NO_3)_3$, 5.6 g. of $Cr(NO_3)_3$ and 60 g. of $Ca(NO_3)_2$ for each 100 cc. of water used in its preparation were placed in a rectangular-shaped stainless steel mixing can into which 10 liters of dibutoxydiethylene glycol had already been placed. This can was provided with an inverted pyramidal bottom bearing a glass stopcock through which the aqueous phase was drained after mixing. After the two phases had been thoroughly mixed for five minutes and then allowed to stand for five minutes until a sharp separation of the phases occurred, the aqueous phase was drawn off into a stainless steel transfer can.

The polyester phase in the mixing can was then washed twice with one liter portions of a $Ca(NO_3)_2$ solution containing sufficient $Ca(NO_3)_2$, e. g., 100 g. of $Ca(NO_3)_2$ per 100 cc. of water to effectively prevent the distribution of any substantial amount of $UO_2(NO_3)_2$ thereinto. These washes with $Ca(NO_3)_2$ solution served to remove any iron that might have become dissolved in the polyether phase. These aqueous washings with $Ca(NO_3)_2$ solution were added to the aqueous phase in the stainless steel transfer can. The uranium was then washed out of the polyether phase with four successive 2½ liter water washes. The first water wash contained enough $NH_4OH$ to neutralize most of the acid in the polyether phase. Five or six water washes would have been necessary if the acid in the polyether phase had not been neutralized in the first water wash.

The aqueous solution in the transfer can was then poured into another rectangular-shaped stainless steel mixing can which was similar to the one previously used and which also contained 10 liters of dibutoxy-diethylene glycol. After the two phases had been thoroughly mixed and allowed to separate, the aqueous phase was drawn off into a second stainless steel transfer can. 15 cc. of concentrated nitric acid for each liter of aqueous phase in the transfer can was added thereto to replace acid which had been extracted into the polyether phase and thereby prevent any precipitation in the unstabilized aqueous phase due to hydrolysis of ferric salts.

The aqueous solution in the second transfer can was then poured into a third rectangular-shaped stainless steel mixing can which contained 10 liters of dibutoxydiethylene glycol. After the two phases had been thoroughly mixed and allowed to separate, the aqueous phase was drawn off and 15 cc. of concentrated $HNO_3$ was added for each liter thereof. The aqueous phase was then analyzed to determine its uranium content. In three different runs made in accordance with the directions set forth in this example, it was found that the aqueous phase remaining after the third extraction contained only from 0.02 to 0.03 mg. of U per liter. It may therefore be seen that the extraction process outlined in this example recovers the uranium almost quantitatively from solution.

If a number of batches of aqueous solution are to be successively extracted to isolate the uranium content thereof, it is advantageous to use the polyether which was used in the second extraction of the first batch and which contains a small amount of uranium in the first extraction of the second batch. Then the polyether which had been used in the third extraction of the first batch is used in the second extraction of the second batch and then for the first extraction of the third batch. Subsequently, the third and final extraction of the second batch is made with the polyether which was used in the first extraction of the first batch and from which the uranium has been stripped by water washing. This cycle of operations may be repeated indefinitely.

EXAMPLE II 10 liters of an aqueous solution which contained 5 g. of U (added as $UO_2(NO_3)_2$), 22 g. of $Fe(NO_3)_3$, 5.6 g. of $Cr(NO_3)_3$, 50 g. of $Cu(NO_3)_2$, and 5.6 g. of $CuCl_2$ for each 100 cc. of water used in its preparation were placed in a rectangular-shaped stainless steel mixing can into which 10 liters of dibutoxydiethylene glycol had already been placed. This can was provided with an inverted pyramidal bottom bearing a glass stopcock through which the aqueous phase was drained after mixing. After the two phases had been thoroughly mixed and then allowed to stand until a sharp separation of the phases occurred, the aqueous phase was drawn off into a stainless steel transfer can.

The polyether phase in the mixing can was then washed twice with one liter portions of a $Cu(NO_3)_2$ solution containing 75 to 80 g. of $Cu(NO_3)_2$ dissolved in 100 cc. of water. These washes with $Cu(NO_3)_2$ solution served to remove any iron that might have become dissolved in the polyether phase. These aqueous washings with $Cu(NO_3)_2$ solution after separation from the polyether were added to the aqueous phase in the stainless steel transfer can. The uranium was then washed out of the polyether phase with four successive 2½ liter water washes. The first water wash contained enough $NH_4OH$ to neutralize 0.2 mole of $HNO_3$ per liter of the polyether phase. Five or six water washes would have been necessary if most of the acid in the polyether phase had not been neutralized in the first water wash. Instead of incorporating enough $NH_4OH$ in the first wash water, it has been found feasible to reduce the acidity of the polyether phase by substituting for the second liter of $Cu(NO_3)_2$ wash solution one liter of a $Ca(NO_3)_2$ wash solution containing 100 g. of $Ca(NO_3)_2$ per 100 cc. of water and a sufficient amount of $NH_4OH$ to reduce the acidity in the polyether phase to about 0.05 N to 0.1 N.

It was found that the free acid concentration in this first polyether phase was 0.5 N. If none of this free acid was neutralized, the polyether phase still contained 11 mg. of U after four washings with four 2½ liter portions of water. On the other hand, when the first water wash contained enough $NH_4OH$ to neutralize 0.2 mole of $HNO_3$ per liter of polyether phase, then only 1.2 mg. of U remained in the polyether phase after four washings with 2½ liter portions of water. Since the distribution coefficient (water/ether) of $UO_2(NO_3)_2$ decreases with increasing acid concentration, in either the ether or water phase, it is important, as the above results show, to reduce the acidity of the ether phase to a low value before or simultaneously with the washing of the U into water. If this is not done, a larger volume of water washes becomes necessary. The value of the distribution coefficient (water/ether) for $UO_2(NO_3)_2$ increases with consecutive water washings. This increase is due in part to the lowering of the uranium concentration but in the main to the removal of acid by the water washes.

The aqueous solution in the transfer can was then poured into another rectangular-shaped stainless steel mixing can which was similar to the one previously used and which also contained 10 liters of dibutoxy-diethylene glycol. After the two phases had been thoroughly mixed and allowed to separate, the aqueous phase was drawn off into a second stainless steel transfer can, and 15 cc. of concentrated $HNO_3$ was added for each liter thereof to replace acid which had been extracted into the polyether phase and thereby prevent any precipitation in the unstabilized aqueous phase due to hydrolysis.

The aqueous solution in the second transfer can was then poured into a third rectangular-shaped stainless steel mixing can which contained 10 liters of dibutoxy-diethylene glycol. After the two phases had been thoroughly mixed and allowed to separate, the aqueous phase was drawn off and 15 cc. of concentrated $HNO_3$ was added for each liter thereof. The aqueous phase was then analyzed to determine its uranium content. In four different runs made in accordance with the directions set forth in this example, it was found that the aqueous phase remaining after the third extraction contained from 0.01 to 0.05 mg. of U per liter, the average being 0.0225 mg. of U per liter. It may therefore be seen that the extraction process outlined in this example results in a practically quantitative recovery of uranium from solution.

EXAMPLE III 10 liters of an aqueous solution that contained 0.5 g. of U (added as $UO_2(NO_3)_2$), 1.08 g. of $Fe(NO_3)_3$, and 85 g. of $Cu(NO_3)_2$ for each 100 cc. of water used in its preparation were placed in a stainless steel mixing can which was similar to those described in the preceding examples and which already contained 10 liters of dibutoxydiethylene glycol. After the two phases had been thoroughly mixed and then allowed to stand until a sharp separation of the phases had occurred, the aqueous phase was run off into a stainless steel transfer can.

The uranium was then washed out of the polyether phase with several 2½ liter portions of water. It was found that the polyether phase was 0.2 N in acid and that if no attempt was made to neutralize this acid 0.023 g. of U remained in the polyether phase after washing with two 2½ liter portions of water and 0.0003 g. of U remained in the polyether phase after washing with three 2½ liter portions of water. On the other hand, when the first portion of wash water contained enough $NH_4OH$ to reduce the acidity of the polyether phase to 0.05 N, it was found that after washing with two 2½ liter portions of water only 0.006 of U remained in the polyether phase. This showed that the uranium may be recovered more effectively by neutralizing most of the acid in the polyether phase in the first water wash. When the initial acid normality of the polyether phase was 0.2 N, three washings with 2½ liter portions of water were required to recover the U substantially quantitatively but when the acid normality was reduced to 0.05 N, by the addition of sufficient $NH_4OH$ to the first water wash, two washings were adequate.

To the aqueous phase in the transfer can there was then added 6 cc. of concentrated $HNO_3$ for each liter thereof to replace acid which had been extracted by the polyether and thereby prevent any precipitation in the unstabilized aqueous phase. The aqueous solution in the transfer can was then poured into another stainless steel mixing can that was similar to the one previously used and which also contained 10 liters of dibutoxydiethylene glycol. After the two phases had been thoroughly mixed and allowed to separate, the aqueous phase was drawn off into a second stainless steel transfer can, and 6 cc. of concentrated $HNO_3$ was added for each liter thereof to replace the acid that had been extracted into the polyether phase.

The aqueous solution in the second transfer can was then poured into a third stainless steel mixing can which contained 10 liters of dibutoxydiethylene glycol. After the two phases had been thoroughly mixed and allowed to separate, the aqueous phase was drawn off and 6 cc. of concentrated $NHO_3$ was added for each liter thereof. The aqueous phase was then analyzed to determine its uranium content. In four different runs made in accordance with directions set forth in this example it was found that the aqueous phase remaining after the third extraction contained from 0.02 to 0.05 mg. of U per liter, the average being 0.035 mg. of U per liter. It may therefore be seen that the extraction process outlined in this example results in a practically quantitative recovery of uranium from solution.

The invention will now be illustrated by analytical procedures for determining uranium which make use of the extraction processes of the present invention.

*The analytical determination of uranium employing extraction procedures*

The uranium content of solutions containing uranium along with other metals may be determined in accordance with the present invention with reasonable speed and accuracy by extracting hexavalent uranium from aqueous nitrate solutions by means of a suitable polyether, such as dibutoxytetraethylene glycol or dibutoxydiethylene glycol, thereafter removing the uranium from the polyether phase by washing with an aqueous $(NH_4)_2SO_4$ solution, and precipitating the uranium as ammonium diuranate which is then ignited to $U_3O_8$.

Under ordinary conditions, samples may be handled which contain anywhere from 0.5 g. of uranium per 100 cc. of solution down to 0.5 to 1 part of uranium per million. With extremely dilute solutions, the accuracy of the determination is limited only by the volume of the sample used and the precision of weighing. With larger amounts of uranium, analyses have checked to within 0.5%, and, when samples containing a known amount of uranium were run, the accuracy averaged around 0.5%. Not only is the extraction method of this invention characterized by its adaptability to the determination of uranium over a wide range of concentration, but it is suitable for analyzing solutions also containing extremely high concentrations of other elements such as iron and chromium.

The analytical procedure used in ascertaining the amount of uranium contained in an aqueous solution that contains from 10 to 500 mg. of U per 100 cc. along with other metals such as iron will first be described. In this procedure the uranium is usually extracted from an aqueous ammonium nitrate solution by dibutoxytetraethylene glycol, after which the ether phase is washed once or twice with a fresh $NH_4NO_3$ solution to remove iron. If necessary, this $NH_4NO_3$ wash solution may be extracted with a small quantity of additional fresh dibutoxytetraethylene glycol to remove traces of uranium therefrom. This polyether extract is combined with the main polyether phase, and the uranium is extracted back into an aqueous $(NH_4)_2SO_4$ solution and determined gravimetrically.

Alternatively, if the solution to be analyzed contains fairly large amounts of salting out agents, such as $Ca(NO_3)_2$ or $Cu(NO_3)_2$ or is approximately saturated with $Fe(NO_3)_3$, it is more desirable to use dibutoxydiethylene glycol to extract the uranium. When this ether is used as the extraction solvent, any iron which goes into the ether phase is removed by washing the ether phase with a rather concentrated solution of $Ca(NO_3)_2$ or $Cu(NO_3)_2$ but the uranium remains dissolved in the ether phase.

When chloride ion is present, considerably more iron is extracted into the polyether from the solution being analyzed. Under these conditions more washings with a concentrated nitrate salt solution will be required than are normally needed, and in some instances, it may even be desirable to remove the chloride ion by precipitation as AgCl before extraction. If a considerable amount of ferric and chloride ions are extracted along with $UO_2(NO_3)_2$ by the polyether from which they are in turn taken up by up by the aqueous $(NH_4)_2SO_4$ solution, then the ammonium diuranate precipitated from this latter solution will be contaminated with iron. This iron contaminated ammonium diuranate precipitate should then be dissolved in a minimum quantity of nitric acid, $NH_4NO_3$ added thereto to make a fairly concentrated solution and the extraction repeated using dibutoxytetraethylene glycol.

As an illustration of the application of the method, the following procedure was employed in the analysis of solutions containing from about 30 mg. to about 400 mg. of uranium and from 10 to approximately 30 times as much iron in 100 cc. samples that also contain an amount of salting out agent sufficient to make the distribution coefficient (ether/water) for $UO_2(NO_3)_2$ have a value of approximately 200.

The solution to be extracted, containing the requisite amount of salting out agent to give a distribution coefficient for $UO_2(NO_3)_2$ of about 200 and a volume of polyether approximately equal to one-half that of the aqueous phase is poured into a separatory funnel, and the phases are mixed. After mixing and settling, the phases are separated, and the aqueous nitrate solution is extracted as before with another portion of polyether having a volume of approximately one quarter that of the aqueous phase. The ether phases are combined, put into a separatory funnel and washed with one-tenth to one-fifth the volume of an approximately three-quarters saturated $NH_4NO_3$ solution (160 g. per 100 cc. of water) when dibutoxytetraethylene glycol has been used. If dibutoxydiethylene glycol has been used, a three-quarters saturated $Ca(NO_3)_2$ solution (104 g. per 100 cc. of water) is employed in place of the $NH_4NO_3$ solution. Under most conditions a single washing with the concentrated $NH_4NO_3$ or $Ca(NO_3)_2$ solution is sufficient to remove iron from the polyether phase, but if a considerable amount of iron has been extracted, it may be necessary to repeat this washing operation. It may be desirable to extract these nitrate washings with a small amount of fresh polyether to remove the uranium which has become distributed therein. This polyether extract is then combined with the previous polyether extracts. As a general rule, however, with 100 mg. of U or less in 100 cc. of solution, the amount of U lost in two washings with a concentrated nitrate solution will not be over 0.1 or 0.2 mg. (0.1% to 0.2%), provided the phases are separated cleanly and the aqueous phases are not contaminated with polyether phase.

To determine the uranium, the combined polyether phases are washed twice with roughly one-half their volume of an approximately three-quarters saturated $(NH_4)_2SO_4$ solution. These aqueous sulfate solution extracts are combined, heated to 70°–100° C., and ammonium hydroxide is added in excess. The precipitate is digested for a short time, then filtered onto ashless filter paper and ignited to $U_3O_8$.

In one typical experiment wherein dibutoxytetraethylene glycol was used as the extraction agent and $NH_4NO_3$ as the salting out agent a theoretical recovery of U was obtained from a 100–150 cc. sample which contained 0.64 g. of Fe and 0.0311 g. of U in solution. In another typical experiment using the same extraction agent and salting out agent and wherein a 100–150 cc. sample contained 0.90 g. of Fe and 0.0311 g. of U in solution, it was found that the recovery of U was within 0.3% of the amount of U actually placed in the solution. In still another experiment, wherein 100 cc. of the sample solution contained 4.1 g. of Fe and 0.411 g. of U and this same combination of extraction and salting out agents was employed, it was found that the recovery of U was within 0.1% of the amount of U actually placed in the solution. In general, the recovery of U was quantitative within the limit of the experimental error of weighing.

While all the experiments mentioned in the preceding paragraph were carried out using dibutoxytetraethylene glycol as the extraction agent and $NH_4NO_3$ as the salting out agent, it was found equally as satisfactory for analytical purposes in the recovery and determination of a small amount of uranium in low concentration in an aqueous phase to use dibutoxydiethylene glycol as the extraction agent and either $Ca(NO_3)_2$ or $Cu(NO_3)_2$ as the salting out agent.

A modification of the above described analytical procedure has been developed for the purpose of determining as little as 1 to 10 parts of uranium in 10,000,000 parts of solution with a precision which depends upon the amount of material present in the sample. In general, the stages of this modified procedure are as follows:

(1) the solution to be analyzed is approximately three quarters saturated with $Ca(NO_3)_2$ or $Cu(NO_3)_2$ and then is washed once with an equal volume of a polyether, such as dibutoxydiethylene glycol, or several times with a smaller volume of polyether;

(2) the ether extract (or combined extracts) is washed once or twice with a small amount of a concentrated $Ca(NO_3)_2$ or $Cu(NO_3)_2$ solution to remove the iron from the ether phase;

(3) the polyether phase is then washed once or several times with a very small volume of ammonium sulfate solution to extract the uranium therefrom, the final volume of the combined sulfate washings being roughly equal to 1 or 2% of volume of the original solution being analyzed;

(4) if sufficiently pure, the uranium may be precipitated directly from the ammonium sulfate solution and determined gravimetrically. If considerable iron has been carried into the ammonium sulfate solution, it is desirable to add $NH_4OH$ to precipitate all of the uranium and iron values from the ammonium sulfate solution, and then to dissolve this precipitate in nitric acid. The resulting solution is just neutralized with ammonium hydroxide, and then approximately three-quarters saturated with $NH_4NO_3$ after which the uranium is extracted therefrom with dibutoxytetraethylene glycol. If necessary, the polyether phase is then washed with a fresh $NH_4NO_3$ solution to remove iron from the ether phase.

The following examples illustrate the application of the extraction procedure of the present invention to the determination of minute amounts of uranium in solution.

EXAMPLE A 10 liters of a solution which contained 115 g. of $Ca(NO_3)_2$ for each 100 cc. of water used in its preparation and 0.0111 g. of U was extracted twice with two 2 liter portions of dibutoxydiethylene glycol and was then extracted a third time with a 1 liter portion of this same polyether. These combined ether extracts (5000 cc.) were in turn washed first with 100 cc. of a half saturated aqueous ammonium sulfate solution, second with a 50 cc. portion of a half saturated ammonium sulphate solution and finally with 50 cc. of water. The combined volume of these three washings was 200 cc. In effect, therefore, the concentration of uranium was increased to 50 times its concentration in the original sample solution, thereby enabling the determination of uranium to be carried out gravimetrically. The uranium was precipitated from this 200 cc. of ammonium sulfate washings with $NH_4OH$ and determined gravimetrically as $U_3O_8$. A recovery of 0.0110 g. of U was obtained which was equivalent to a 99% recovery. This result was quantitative within the error of weighing.

EXAMPLE B

The table at the end of this paragraph gives the results of four experiments in which 10 liters of a solution containing 22 g. of $Fe(NO_3)_3$, 5.6 g. of $Cr(NO_3)_3$, and 60 g. of $Ca(NO_3)_2$ for each 100 cc. of water used in its preparation and also containing the number of milligrams of U indicated in the table was extracted with 10 liters of dibutoxydiethylene glycol. This polyether extract was then washed with 2 liters of an aqueous $Ca(NO_3)_2$ solution containing 100 g. of $Ca(NO_3)_2$ per each 100 cc. of water used in its preparation and enough $NH_4OH$ to neutralize all but 0.05 mole per liter of the acid in the ether phase. This wash eliminated most of the iron from the ether phase. The washed ether phase was then extracted with two 100 cc. portions of a three-quarters saturated $(NH_4)_2SO_4$ solution (three 100 cc. portions were used in experiment $a$). After the uranium was extracted from the polyether with the aqueous $(NH_4)_2SO_4$ solution, $NH_4OH$ was added in excess to precipitate the uranium. This precipitate was digested a short time and collected in centrifuge tubes. Thereafter, the precipitate was dissolved in nitric acid. This nitric acid solution was approximately three-quarters saturated with $NH_4NO_3$ after which the uranium was extracted therefrom with dibutoxytetraethylene glycol. This polyether extract contained the uranium free from iron. The uranium was stripped from this polyether extract with an aqueous ammonium sulfate solution and determined gravimetrically. In the following table the results of four experiments carried out in this manner are indicated.

| Expt. | Mg. of Uranium in Solution | Mg. of Uranium Recovered | Percent of Uranium Recovered | Vol. of Ether Wash., l. | Vol. of $Ca(NO_3)_2$ Wash., l. | $(NH_4)_2SO_4$ Washes | |
|---|---|---|---|---|---|---|---|
| | | | | | | No. | Vol., cc. |
| a | 12.4 | 12.2 | 98 | 10 | 2 | 3 | 100 |
| b | 14.0 | 13.4 | 95 | 10 | 2 | 2 | 100 |
| c | 10.8 | 10.5 | 97 | 10 | 2 | 2 | 100 |
| d | 9.6 | 9.2 | 96 | 10 | 2 | 2 | 100 |

In connection with the above experiments it was found that two washes with 1 liter portions of a $Ca(NO_3)_2$ solution containing 100 g. of $Ca(NO_3)_2$ per each 100 cc. of water used in its preparation removed all the iron from the polyether phase, while a single wash with 2 liters of this $Ca(NO_3)_2$ solution left some iron in the polyether phase. The presence of this iron made necessary the second polyether extraction step employing dibutoxytetraethylene glycol. In practice where the U concentration is low, it is often better not to remove the iron completely by washing the polyether phase with a $Ca(NO_3)_2$ solution before the uranium is extracted into the $(NH_4)_2SO_4$ solution, since iron facilitates the precipitation of U upon the addition of $NH_4OH$ to the $(NH_4)_2SO_4$ extract. When large enough amounts of U are present so that no difficulty is encountered in quantitatively precipitating U from the $(NH_4)_2SO_4$ extract by the addition of $NH_4OH$, it is entirely feasible to remove all the iron from the polyether extract by washing it with a $Ca(NO_3)_2$ solution.

It has been found that $Ca(NO_3)_2$ is very slightly soluble in the polyether phase in the presence of large amounts of $HNO_3$. Unless the $HNO_3$, which has been extracted from the sample solution being analyzed, is largely neutralized, some $CaSO_4$ will precipitate when the polyether extract is washed with the $(NH_4)_2SO_4$ solution. This precipitation is not too troublesome, since the $CaSO_4$ may be filtered off before the addition of $NH_4OH$ to precipitate the U. However, the extraction of $Ca(NO_3)_2$ by the polyether (and, hence, the amount of $CaSO_4$ precipitated) may be kept to a minimum by neutralizing most of the acid in the polyether phase by incorporating the requisite amount of $NH_4OH$ in the $Ca(NO_3)_2$ solution.

As may be seen from the above table, the maximum error in the recovery of the uranium was 5%, which, in terms of uranium recovery, corresponds to roughly 5 parts per 100 million parts of solution, starting with an initial uranium concentration of 1 p. p. m. The recovery of uranium in each instance was well within the limits required for the determination of the uranium content of solutions and effluents which must be tested to determine whether their uranium content justifies further processing thereof.

EXAMPLE C 10 liters of a solution containing 22 g. of $Fe(NO_3)_3$, 5.6 g. of $Cr(NO_3)_3$, 50 g. of $Cu(NO_3)_2$, and 5.6 g. of $CuCl_2$ for each 100 cc. of water used in its preparation and also containing 0.0102 g. of U—in solution as $UO_2(NO_3)_2$—was extracted with 10 liters of dibutoxydiethylene glycol. The polyether phase was washed with a small volume, e. g., 1 liter, of a $Cu(NO_3)_2$ solution containing 75–80 g. of $Cu(NO_3)_2$ per 100 cc. of water. The wash with the $Cu(NO_3)_2$ solution removed most of the iron from the polyether phase. This was followed by washing the polyether phase with a small volume, e. g., 1 liter of an aqueous $Ca(NO_3)_2$ wash solution containing enough $NH_4OH$ to neutralize most of the acid in the polyether phase. This $Ca(NO_3)_2$ wash solution removed any $Cu(NO_3)_2$ that might have dissolved in the ether phase. The uranium was then stripped from the polyether phase with two 100 cc. portions of a three-quarters saturated aqueous $(NH_4)_2SO_4$ solution. The uranium was precipitated from this solution with $NH_4OH$, and the precipitate was collected in centrifuge tubes. This precipitate was dissolved in nitric acid and further purified in an extraction operation wherein $NH_4NO_3$ was used as a salting out agent and dibutoxytetraethylene glycol was employed as the extraction solvent. The uranium was removed from the dibutoxytetraethylene glycol by washing said polyether with an aqueous $(NH_4)_2SO_4$ solution from which it was in turn precipitated by means of $NH_4OH$ and determined gravimetrically. A recovery of 0.0098 g. of uranium (96% of the uranium) was obtained by following the procedure just outlined. The recovery of uranium was well within the limits required in practice for estimating uranium in very dilute solutions.

Washing the polyether phase with a $Ca(NO_3)_2$ solution does not adequately remove iron therefrom when the sample solution to be extracted and analyzed contains chloride ions as in Example C. However, washing with a $Cu(NO_3)_2$ solution removes the iron effectively from a polyether extract of a sample solution containing chloride ions.

EXAMPLE D

The table at the end of this paragraph gives the results of several experiments which were run to ascertain the efficacy of extraction procedures for recovering from 5 to 10 mg. of uranium contained in 100 to 500 cc. of a sample solution which was made up to also contain from 44 to 105 g. of $Ca(NO_3)_2$, from 16 to 44 g. of $Fe(NO_3)_3$ and from 4 to 11.2 g. of $Cr(NO_3)_3$ per each 100 cc. of water used in making up said sample solution. The make up of each of these sample solutions is indicated in the subjoined table which also indicates the excess $HNO_3$ concentration of these sample solutions after free $HNO_3$ has been added thereto. In all of these experiments the uranium was extracted from the sample solutions by means of dibutoxydiethylene glycol. The total volume of the sample solution being extracted, the total amount of polyether employed for extraction and the number of extractions or passes made with the polyether are indicated in the table below. In any experiment where several extractions with polyether were made, approximately equal volumes of polyether were used in each pass. The uranium extracted by the dibutoxydiethylene glycol was washed back into a half-saturated aqueous $(NH_4)_2SO_4$ solution from which it was precipitated by the addition of $NH_4OH$. This precipitate was washed free of sulfate ion and dissolved in $HNO_3$. The dissolved uranium was further purified using dibutoxytetraethylene glycol as the extraction solvent and $NH_4NO_3$ as the salting out agent and then determined gravimetrically in the manner indicated in the previous examples.

| Expt. No. | Grams of Nitrates per 100 cc. of $H_2O$ | | | Conc. Excess $HNO_3$ | Volumes in cc. | | No. of Ether Passes | Mg. of U | | Percent U Recovered |
|---|---|---|---|---|---|---|---|---|---|---|
| | Ca | Fe | Cr | | Sample Soln. | Ether Wash | | Employed | Recovered | |
| (1) | 105 | 16 | 4.0 | 0.4 N | 490 | 100 | 2 | 5.63 | 5.5 | 98 |
| (2) | 100 | 16 | 4.0 | 0.4 N | 500 | 300 | 3 | 5.1 | 4.9 | 96 |
| (3) | 100 | 16 | 4.0 | 0.1 N | 100 | 100 | 1 | 5.3 | 5.2 | 98 |
| (4) | 100 | 16 | 4.0 | None | 500 | 200 | 2 | 5.7 | 5.8 | 101 |
| (5) | 100 | 24 | 6.1 | None | 125 | 60 | 2 | 6.4 | 6.3 | 98 |
| (6) | 44 | 44 | 11.2 | None | 500 | 300 | 2 | 5.7 | 5.5 | 97 |
| (7) | 44 | 44 | 11.2 | None | 500 | 200 | 2 | 10.0 | 9.8 | 98 |

In experiment (2) enough $HNO_3$ was added to the aqueous phase after each extraction to make the solution being analyzed 0.2 N in added acid. When nickel and copper in the form of nitrates corresponding to approximately one-tenth the iron concentration were added to the solutions described in the above table, it was found that the recovery of uranium was not affected. As may be seen from the above table, the recovery of uranium was usually quantitative within the error of weighing and was not dependent upon the relative amount of other cations present in the solution being analyzed.

The results of the investigation demonstrates that minute quantities of uranium may be removed from solutions by extraction processes. Not only does the procedure provide a rapid and reliable method for detecting 1 to 10 parts of U in 10 million parts of solution, but the element is obtained in a highly pure state so the actual determination may be made by precipitation with $NH_4OH$ and ignition to $U_3O_8$.

If the aqueous solution from which the uranyl nitrate is to be extracted does not already contain enough salts such as ferric nitrate or cupric nitrate, a low distribution of uranyl nitrate into the polyether phase will be obtained. It is therefore important to know just how much of certain nitrates should be added to the solution being extracted in order to obtain an adequate or desired distribution coefficient (ether/water) for $UO_2(NO_3)_2$. The discussion of salting out agents contained in the following paragraphs will enable those skilled in the art to select the optimum quantities of preferred salting out agents in order to obtain the desired distribution coefficients under a wide variety of conditions.

Salting out agents

It has been found that the best salting out agents for use in extracting hexavalent uranium from aqueous solutions with dialkyl ethers of polyethylene glycols are nitrates of divalent and trivalent metals such as aluminum nitrate, ferric nitrate, calcium nitrate, cupric nitrate, and zinc nitrate. Aluminum nitrate is, by far, the most powerful salting out agent both on a weight concentration and a normality basis. Cupric nitrate and zinc nitrate are very nearly on a par, being less powerful than aluminum nitrate but somewhat superior to calcium nitrate. However, higher values of the coefficient of extraction (org./aq.) may be obtained with cupric, zinc and calcium nitrates because of their extremely high solubilities compared with that of aluminum nitrate. Sodium nitrate lacks sufficient solubility in water to be a good salting out agent. Ammonium nitrate is not as good a salting out agent as the nitrates of divalent and trivalent metals, but it has been found to be sufficiently effective in analytical extraction procedures using the dibutyl ether of tetraethylene glycol as the extracting solvent for hexavalent uranium.

It has been observed that, other conditions being the same, temperature has a surprisingly large effect on the distribution of $UO_2(NO_3)_2$ between polyethers and aqueous solutions containing salting out agents. There is roughly a twofold increase in the coefficient on lowering the temperature by ten degrees centigrade, indicating that it is advantageous to carry out extraction at lower temperatures.

When ammonium nitrate is used as a salting out agent and dibutoxytetraethylene glycol is used as an extraction solvent the distribution coefficient for $UO_2(NO_3)_2$ at 15° C. (ether/water) increases from 24.4 when 60 grams of $NH_4NO_3$ per 100 cc. of water are present to 387 when 140 grams of $NH_4NO_3$ per 100 cc. of water are present. With this same solvent at 27° C. the distribution coefficient for $UO_2(NO_3)_2$ (ether/water) rises from 34.3 when 80 grams of $NH_4NO_3$ per 100 cc. of water are present to a value of 576 when 200 grams of $NH_4NO_3$ per 100 cc. of water are present.

When ammonium nitrate is used as a salting out agent and dibutoxytriethylene glycol is employed as the extraction solvent the distribution coefficient (ether/water) for $UO_2(NO_3)_2$ at room temperature is 36.1 when 160 grams of $NH_4NO_3$ per 100 cc. of water are present and is 102 when 214 grams of $NH_4NO_3$ per 100 cc. of water are present.

When 100 grams of $NH_4NO_3$ per 100 cc. of water is used as the salting out agent and dibutoxytetraethylene glycol is used as the extraction solvent the distribution coefficient (ether/water) for $UO_2(NO_3)_2$ decreases from a value of 453 at 15.5° C. to a value of 160 at 35.5° C.

When calcium nitrate is used as a salting out agent and dibutoxytetraethylene glycol is used as an extraction solvent the distribution coefficient (ether/water) for $UO_2(NO_3)_2$ at room temperature increases from 68 when 60 grams of $Ca(NO_3)_2$ per 100 cc. of water are present to 3400 when 134 grams of $Ca(NO_3)_2$ per 100 cc. of water are present.

When calcium nitrate is used as a salting out agent and the dibutyl ether of diethylene glycol is used as an extraction solvent the distribution coefficient (ether/water) for $UO_2(NO_3)_2$ at 15° C. rises from 63.9 when 75 grams of $Ca(NO_3)_2$ per 100 cc. of water are present to a value of 1560 when 122 grams of $Ca(NO_3)_2$ per 100 cc. of water are present, while at 27° C. the distribution coefficient increases from 29.6 when 75 grams of $Ca(NO_3)_2$ per 100 cc. of water are present to 1430 when 140 grams of $Ca(NO_3)_2$ per 100 cc. of water are present. Coefficients of about 200 are obtained at 27° C. with $Ca(NO_3)_2$ concentrations that are not abnormally high (about 105 g. of $Ca(NO_3)_2$ per 100 cc. of water).

Temperature has a surprisingly large effect on the distribution of $UO_2(NO_3)_2$ between dibutoxydiethylene glycol and aqueous solutions containing calcium nitrate as a salting out agent. The effect of temperature is particularly noticeable at temperatures below 35° C. It was found that with $Ca(NO_3)_2$ as a salting out agent in the concentration ranges ordinarily employed in extraction, the distribution coefficient (ether/water) for $UO_2(NO_3)_2$ increases two-to-threefold on going from 25° to 15° C., indicating that it would be profitable in practice to carry out extraction at the lowest feasible temperature. When 108 grams of $Ca(NO_3)_2$ per 100 cc. of water are present, the distribution coefficient (ether/water) for $UO_2(NO_3)_2$ decreases from 1370 at 5° C. to 182 at 34.8° C. When 125 grams of $Ca(NO_3)_2$ per 100 cc. of water are present, the distribution coefficient (ether/water) for $UO_2(NO_3)_2$ decreases from 1440 at 18° C. to 191 at 45° C. It may, therefore, be seen that with $Ca(NO_3)_2$ as a salting out agent and dibutoxydiethylene glycol as the extraction solvent, the $UO_2(NO_3)_2$ distribution coefficient (ether/water) increases rapidly with decreasing temperature.

When cupric nitrate is used as a salting out agent and dibutoxydiethylene glycol is employed as the extraction solvent, the distribution coefficient (ether/water) for $UO_2(NO_3)_2$ at 15° C. rises from a value of 37.3 when 55 grams of $Cu(NO_3)_2$ per 100 cc. of water are present to a value of 1600 when 105 grams of $Cu(NO_3)_2$ per 100 cc. of water are present. At 27° C. the distribution coefficient (ether/water) rises from a value of 18.6 when 55 grams of $Cu(NO_3)_2$ per 100 cc. of water are present to a value of 1240 when 124.3 grams of $Cu(NO_3)_2$ per 100 cc. of water are present. On a weight basis $Cu(NO_3)_2$ is a better salting out agent than $Ca(NO_3)_2$. For a coefficient of 209 at 27° C., 85 grams of $Cu(NO_3)_2$ are required, while for approximately the same coefficient 105 grams of $Ca(NO_3)_2$ are needed. Coefficients up to and above 1000 may be obtained either with copper nitrate or calcium nitrate.

In an extraction system employing cupric nitrate as the salting out agent and the dibutyl ether of diethylene glycol as the extraction solvent, the distribution coefficient (ether/water) for $UO_2(NO_3)_2$ roughly doubles with each 10° C. decrease in temperature. Therefore, it is advantageous to operate at the lowest practicable temperature. Advantage may then be taken of the effect of temperature in either one of two ways:

(1) A higher value of the coefficient may be obtained for a given concentration of salting out agent, or (2) A lower concentration of salting out agent may be employed to obtain some particular value of the coefficient.

When dibutoxydiethylene glycol is used as the extraction solvent and 85 grams of $Cu(NO_3)_2$ per 100 cc. of water is employed as the salting out agent, the distribution coefficient (ether/water) for $UO_2(NO_3)_2$ falls from a value of 1200 at 5° C. to a value of 125 at 35° C. If 105 grams of $Cu(NO_3)_2$ per 100 cc. of water is employed as the salting out agent, the distribution coefficient (ether/water) for $UO_2(NO_3)_2$ falls from a value of 1600 at 15° C. to a value of 380 at 35° C. It may, therefore, be seen that the distribution coefficient (ether/water) increases rapidly with decreasing temperature when $Cu(NO_3)_2$ is used as a salting out agent.

When zinc nitrate is used as a salting out agent and dibutoxy-diethylene glycol is employed as the extraction solvent, the distribution coefficient (ether/water) for $UO_2(NO_3)_2$ at 15° C. rises from a value of 54 when 58 grams of $Zn(NO_3)_2$ per 100 cc. of water are present to a value of 2360 when 105 grams of $Zn(NO_3)_2$ per 100 cc. of water are present. At 27° C. the distribution coefficient (ether/water) for $UO_2(NO_3)_2$ increases from 26.7 when 58.1 grams of $Zn(NO_3)$ per 100 cc. of water are present to a value of 2080 when 132.5 grams of $Zn(NO_3)_2$ per 100 cc. of water are present. On a weight basis zinc nitrate is a slightly more effective salting out agent than cupric nitrate. Decreasing the temperature at which extraction is carried out by 10° C. approximately doubles the value of the distribution coefficient (ether/water) for $UO_2(NO_3)_2$ when $Zn(NO_3)_2$ is employed as the salting out agent. When 92.1 grams of $Zn(NO_3)_2$ per 100 cc. of water is employed as a salting out agent, the distribution coefficient (ether/water) for $UO_2(NO_3)_2$ drops from a value of 2230 at 5.3° C. to a value of 193 at 35° C. At 27° C. a distribution coefficient of 200 can be obtained by the use of 83 g. of $Zn(NO_3)_2$ per 100 cc. of water.

When ferric nitrate is used as a salting out agent and dibutoxy-tetraethylene glycol is used as an extraction solvent, the distribution coefficient (ether/water) for $UO_2(NO_3)_2$ at room temperatures is 250 when 44 grams of $Fe(NO_3)_3$ per 100 cc. of water are present and is 1970 when 79 grams of $Fe(NO_3)_3$ per 100 cc. of water are present. When dibutoxy-diethylene glycol is employed as the extraction solvent, the distribution coefficient (ether/water) for $UO_2(NO_3)_2$ at 15° C. increases from a value of 31 when 45 grams of $Fe(NO_3)_3$ per 100 cc. of water are present to a value of 485 when 75 grams of $Fe(NO_3)_3$ per 100 cc. of water are present. Using this same extraction solvent at 27° C., the distribution coefficient (ether/water) for $UO_2(NO_3)_2$ rises from 16 when 45 grams of $Fe(NO_3)_3$ per 100 cc. of water are present to a value of 373 when 88.3 grams of $Fe(NO_3)_3$ per 100 cc. of water are present. On a weight basis, $Fe(NO_3)_3$ is a more efficient salting out agent than either $Zn(NO_3)_2$ or $Cu(NO_3)_2$. For a coefficient of 205 at 27° C. only 75 grams of $Fe(NO_3)_3$ are required as against 82 grams of $Zn(NO_3)_2$ and 85 grams for $Cu(NO_3)_2$.

Using dibutoxydiethylene glycol as the extraction solvent and 75 grams of $Fe(NO_3)_3$ per 100 cc. of water as the salting out agent, the distribution coefficient (ether/water) for $UO_2(NO_3)_2$ decreases from a value of 485 at 15° C. to a value of 115 at 35° C. Lowering the temperature by 10° C. approximately doubles the distribution coefficient. Therefore, it is advantageous to carry out extraction at the lowest practical temperature, benefiting thereby from the increased value of the coefficient for a particular concentration of the salting out agent. If it is desired to operate at any particular value of the distribution coefficient, less salting out agent may be used at the lower temperatures.

Ferric nitrate is an effective salting out agent for use in the recovery of uranyl nitrate by extraction with dibutoxydiethylene glycol. A distribution coefficient (ether/water) for $UO_2(NO_3)_2$ of approximately 200 may be obtained with an $Fe(NO_3)_3$ concentration of 75 grams per 100 cc. of water using equal volumes of the two phases and holding the temperature at 27° C.

Ferric nitrate may be employed with particular advantage in systems containing sulfate ions, for unlike the sulfates of calcium or copper which will form when calcium or cupric nitrate are used as salting out agents, ferric sulfate is readily soluble. Consequently, sufficient $Fe(NO_3)_3$ may be put into solution to yield a satisfactory distribution coefficient (ether/water) for $UO_2(NO_3)_2$. When using $Fe(NO_3)_3$ as a salting out agent, the sulfate ion does not interfere seriously with the extraction of $UO_2(NO_3)_2$.

With $Fe(NO_3)_3$ as salting out agent a very considerable amount of nitrate ion may be removed as nitric acid by the polyethers without forming an unstable aqueous solution. The distribution coefficient (ether/water) for $UO_2(NO_3)_2$ decreases with increasing acid deficiency; consequently it is advisable to maintain the acid content of these solutions at the equivalence point or slightly above during extraction operations.

When aluminum nitrate is used as the salting out agent and dibutoxy-tetraethylene glycol is employed as the extraction solvent, the distribution coefficient (ether/water) for $UO_2(NO_3)_2$ at 27° C. increases from 23.3 when 25 grams of $Al(NO_3)_3$ per 100 cc. of water are present to 1850 when 55 grams of $Al(NO_3)_3$ per 100 cc. of water are present.

When aluminum nitrate is used as the salting out agent and dibutoxytriethylene glycol is used as the extraction solvent, the distribution coefficient (ether/water) for $UO_2(NO_3)_2$ at 27° C. is 104 when 40 grams of $Al(NO_3)_3$ per 100 cc. of water are present and is 480 when 50 grams of $Al(NO_3)_3$ per 100 cc. of water are present.

When dibutoxydiethylene glycol is used as the extraction solvent and aluminum nitrate is employed as the salting out agent, the distribution coefficient (ether/water) for $UO_2(NO_3)_2$ at 15° C. increases from a value of 18.5 when 35 grams of $Al(NO_3)_3$ per 100 cc. of water are present to a value of 550 when 58 grams of $Al(NO_3)_3$ per 100 cc. of water are present. At 27° C. the distribution coefficient (ether/water) for $UO_2(NO_3)_2$ rises from a value of 22.3 when 40 grams of $Al(NO_3)_3$ per 100 cc. of water are present to a value of 470 when 66 grams of $Al(NO_3)_3$ per 100 cc. of water are present.

Aluminum nitrate is the most effective of the various salting out agents used. With only 58 grams of $Al(NO_3)_3$ per 100 cc. of water present, the distribution coefficient (ether/water) for $UO_2(NO_3)_2$ at 27° C. is 240 as compared with a coefficient of about 205 attained with 75 grams of $Fe(NO_3)_3$ or with 85 grams of $Cu(NO_3)_2$. Distribution coefficients of 1000 or more cannot be obtained with $Al(NO_3)_3$ because of its limited solubility.

With dibutoxydiethylene glycol as the extraction solvent and with $Al(NO_3)_3$ as the salting out agent, the $UO_2(NO_3)_2$ distribution coefficient (ether/water) increases rapidly with decreasing temperature. For example, with 53.5 grams of $Al(NO_3)_3$ per 100 cc. of water present, the distribution coefficient (ether/water) for $UO_2(NO_3)_2$ increases from a value of 87 at 35° C. to 635 at 5° C. With 58 grams of $Al(NO_3)_3$ per 100 cc. of water present said coefficient rises from a value of 121 at 35° C. to a value of 638 at 13° C. With 66 grams of $Al(NO_3)_3$ per 100 cc. of water present, said coefficient is 503 at 26.5° C. and 284 at 35° C. It is advantageous to carry out extraction of the lowest practical temperature, benefiting thereby from the increased value of the coefficient for a particular concentration of $Al(NO_3)_3$. If it is impractical to operate with the $UO_2(NO_3)_2$ distribution coefficient above a certain optimum value, less $Al(NO_3)_3$ may be used at a lower temperature to attain this optimum value for the distribution coefficient. In carrying out a batch extraction process, it is desirable to operate under conditions giving a $UO_2(NO_3)_2$ distribution coefficient (ether/water) of from 200 to 300. To obtain a coefficient of 300 at 33° C., 66 grams of $Al(NO_3)_3$ per 100 cc. of water are required; at 23.5° C., 58 grams of $Al(NO_3)_3$ per 100 cc. of water are needed, and at 15° C. only 53.5 grams of $Al(NO_3)_3$ per 100 cc. of water are necessary.

Using dibutoxytetraethylene glycol as the extraction solvent and 36.6 grams of $Al(NO_3)_3$ per 100 cc. of water as the salting out agent, the distribution coefficient (ether/water) for $UO_2(NO_3)_2$ rises from a value of 126 at 35° C. to a value of 519 at 10° C.

Instead of using a single inorganic nitrate as a salting out agent, it is feasible to use a mixture of two or more soluble inorganic nitrates. As a general rule there does not appear to be any particular advantage in using a mixture of two or more soluble inorganic nitrates to drive the uranyl nitrate into the ether phase.

When ammonium nitrate is added to a solution of aluminum nitrate, the distribution coefficient (ether/water) of $UO_2(NO_3)_2$ is lowered. Using dibutoxydiethylene glycol as the extraction solvent, the distribution coefficient (ether/water) of $UO_2(NO_3)_2$ at 27° C. drops from a value of 470 when 66 grams of $Al(NO_3)_3$ per 100 cc. of water are present to a value of 158 when 65 grams of $Al(NO_3)_3$ and 50 grams of $NH_4NO_3$ per 100 cc. of water are present. It may, therefore, be seen that while a mixture of $Al(NO_3)_3$ and $NH_4NO_3$ may feasibly be employed as a salting out agent, it possesses no particular advantage over $Al(NO_3)_3$ per se.

When sodium nitrate is added to a solution of aluminum nitrate, the distribution coefficient (ether/water) of $UO_2(NO_3)_2$ is increased. However, the solubility relations are such that one cannot operate with much more than about 20 grams of $NaNO_3$ per 100 cc. of water. At higher $NaNO_3$ concentrations, the solubility of $Al(NO_3)_3$ falls off rapidly as does the distribution coefficient for $UO_2(NO_3)_2$. Using dibutoxydiethylene glycol as the extraction solvent, the distribution coefficient (ether/water) of $UO_2(NO_3)_2$ at 27° C. rises from a value of 470 when 66 grams of $Al(NO_3)_3$ per 100 cc. of water are present to a value of 755 when 68.4 grams of $Al(NO_3)_3$ and 19 grams of $NaNO_3$ per 100 cc. of water are present and then falls to a value of 364 when the presence of 22.4 grams of $NaNO_3$ per 100 cc. of water reduces the $Al(NO_3)_3$ concentration to 56 grams per 100 cc. of water. The distribution coefficient (ether/water) for $UO_2(NO_3)_2$ increases rapidly with increasing $NaNO_3$ concentration up to the invariant point. Beyond the invariant point the coefficient drops off rapidly with added $NaNO_3$.

Mixtures of calcium nitrate and aluminum nitrate are powerful salting out agents. Using dibutoxydiethylene glycol as the extraction solvent, the distribution coefficient (ether/water) for $UO_2(NO_3)_2$ at 27° C. is only 96 when 50 grams of $Al(NO_3)_3$ per 100 cc. of water are present and is only 10 when 60 grams of $Ca(NO_3)_2$ per 100 cc. of water are present but jumps to a value of 2140 when 50 grams of $Al(NO_3)_3$ plus 60 grams of $Ca(NO_3)_2$ per 100 cc. of water are present. A distribution coefficient (ether/water) for $UO_2(NO_3)_2$ of 1430 may be obtained when 140 grams of $Ca(NO_3)_2$ per 100 cc. of water are present. Likewise, a coefficient of 470 is obtained when 66 grams of $Al(NO_3)_3$ per 100 cc. of water are present. It may therefore be seen that when dibutoxydiethylene glycol is used as an extraction solvent for $UO_2(NO_3)_2$, mixtures of $Al(NO_3)_3$ and $Ca(NO_3)_2$ constitute better salting out agents than either of the components of these mixtures. The distribution coefficient reaches a maximum in the neighborhood of the invariant point for saturated solutions containing mixtures of $Al(NO_3)_3$ and $Ca(NO_3)_2$.

Mixtures of $Al(NO_3)_3$ and $Fe(NO_3)_3$ display no particular advantage as salting out agents over either of these salts per se, since the solubility of $Al(NO_3)_3$ is decreased materially on the addition of a moderate amount of $Fe(NO_3)_3$. Using dibutoxydiethylene glycol as the extraction solvent, the distribution coefficient (ether/water) for $UO_2(NO_3)_2$ at 27° C. attains a value of 510 when 27.8 grams of $Al(NO_3)_3$ and 54.7 grams of $Fe(NO_3)_3$ per 100 cc. of water are present. All other mixtures of $Al(NO_3)_3$ and $Fe(NO_3)_3$ tested yield distribution coefficient values lower than 470 which can be obtained by the use of 66 grams of $Al(NO_3)_3$ per 100 cc. of water.

Mixtures of calcium nitrate and ammonium nitrate give rise to high distribution coefficients (ether/water) for $UO_2(NO_3)_2$, because the solubility of $Ca(NO_3)_2$ is increased by the addition of $NH_4NO_3$. Using dibutoxydiethylene glycol as the extraction solvent, the distribution coefficient (ether/water) for $UO_2(NO_3)_2$ at 27° C. attains a value of 900 when 180 grams of $Ca(NO_3)_2$ and 150 grams of $NH_4NO_3$ per 100 cc. of water are present and a value of 1700 when 204 grams of $Ca(NO_3)_2$ and 214.2 grams of $NH_4NO_3$ per 100 cc. of water are present.

Various mixtures of calcium nitrate and ferric nitrate have been effectively utilized as salting out agents for uranyl nitrate. Using dibutoxydiethylene glycol as the extraction solvent, the distribution coefficient (ether/water) for $UO_2(NO_3)_2$ at room temperature goes from a value of 60 when 9.8 grams of $Fe(NO_3)_3$ and 69 grams of $Ca(NO_3)_2$ per 100 cc. of water are present to a value of 1300 when 9.8 grams of $Fe(NO_3)_3$ and 135 grams of $Ca(NO_3)_2$ per 100 cc. of water are present. This coefficient varies from 161 when 44 grams of $Fe(NO_3)_3$ and 44 grams of $Ca(NO_3)_2$ per 100 cc. of water are present to 590 when 43 grams of $Fe(NO_3)_3$ and 70 grams of $Ca(NO_3)_2$ per 100 cc. of water are present. This coefficient at a value of 369 when 66 grams of $Fe(NO_3)_3$ and 36 grams of $Ca(NO_3)_2$ per 100 cc. of water are present. Frequently the ferric nitrate which functions as a salting out agent will be initially present in the solution from which the uranyl nitrate is to be extracted. In order to minimize the quantity of iron extracted, the amount of $Ca(NO_3)_2$ employed as a salting out agent is determined in accordance with the ferric nitrate concentration in the solution to be extracted. In order to keep down the amount of iron extracted the amount of $Ca(NO_3)_2$ to be added to the solution as a salting out agent should be the smallest amount which will give a reasonable value for the distribution coefficient for $UO_2(NO_3)_2$.

The distribution coefficients discussed in the preceding paragraph and in the next four paragraphs were made without closely controlling the temperature during extraction. When the exact temperature at which an extraction was carried out is not mentioned in this specification, it is to be understood that it was carried out at a temperature somewhere in the range from 10° C. to 35° C., which may be designated as ambient temperature, or more probably somewhere in the range from 20° C. to 25° C., which may be designated as room temperature.

Using dibutoxytetraethylene glycol as the extraction solvent, the distribution coefficient (ether/water) for $UO_2(NO_3)_2$ at room temperature goes from a value of 310 when 80 grams of $Ca(NO_3)_2$ and 0.83 gram of $Fe(NO_3)_3$ per 100 cc. of water are present to a value of 1490 when 80 grams of $Ca(NO_3)_2$ and 14.7 grams of $Fe(NO_3)_3$ per 100 cc. of water are present, and it attains a value of 1900 when 125 grams of $Ca(NO_2)_2$ and 9 grams of $Fe(NO_3)_3$ per 100 cc. of water are present.

Mixtures of calcium nitrate, ferric nitrate and chromium nitrate are also suitable for use as salting out agents for uranyl nitrate. Using dibutoxydiethylene glycol as the extraction solvent, the distribution coefficient (ether/water) for $UO_2(NO_3)_2$ at room temperature rises from a value of 135 when 22 grams of $Fe(NO_3)_3$, 5.6 grams of $Cr(NO_3)_3$ and 50 grams of $Ca(NO_3)_2$ per 100 cc. of water are present to a value of 510 when 22 grams of $Fe(NO_3)_3$, 5.6 grams of $Cr(NO_3)_3$ and 75 grams of $Ca(NO_3)_2$ per 100 cc. of water are present and attains a value of 585 when 44 grams of $Fe(NO_3)_3$, 10.6 grams of $Cr(NO_3)_3$ and 44 grams of $Ca(NO_3)_2$ per 100 cc. of water are present.

Mixtures of cupric nitrate and ferric nitrate may be successfully used as salting out agents for uranyl nitrate. Using dibutoxydiethylene glycol as the extraction solvent, the distribution coefficient (ether/water) for $UO_2(NO_3)_2$ at room temperature varies from 145 when 44 grams of $Fe(NO_3)_3$ and 35 grams of $Cu(NO_3)_2$ per 100 cc. of water are present to 780 when 44 grams of $Fe(NO_3)_3$ and 74 grams of $(CuNO_3)_2$ per 100 cc. of water are present. The coefficient also varies from a value of 180 when 33 grams of $Fe(NO_3)_3$ and 50 grams of $Cu(NO_3)_2$ per 100 cc. of water are present to a value of 700 when 36 grams of $Fe(NO_3)_3$ and 74 grams of $Cu(NO_3)_2$ per 100 cc. of water are present and attains a value of 840 when 11 grams of $Fe(NO_3)_3$ and 129 grams of $Cu(NO_3)_2$ per 100 cc. of water are present. When the aqueous solution contains about 35 grams of $Fe(NO_3)_3$ per 100 cc. of water, the $Cu(NO_3)_2$ concentration should be kept below 60 grams per 100 cc. of water in order to prevent a sizable quantity of iron from being extracted into the organic phase.

Mixtures of ammonium nitrate and ferric nitrate may also be employed for salting out agents for uranyl nitrate. Using dibutoxytetraethylene glycol as the extraction solvent, the distribution coefficient (ether/water) for $UO_2(NO_3)_2$ at room temperature varies from 296 when 20.4 grams of Fe(NO$_3$)$_3$ and 100 grams of NH$_4$NO$_3$ per 100 cc. of water are present to 640 when 19.1 grams of Fe(NO$_3$)$_3$ and 160 grams of NH$_4$NO$_3$ per 100 cc. of water are present.

Since acid has a marked effect upon extraction, knowlege and control of acidity is desirable in order that the extraction may be performed under optimum conditions. The effect and control of acid during extraction is discussed in the following paragraphs.

*Influence and control of acid in extraction*

When dialkyl ethers of polyethylene glycols are employed in extracting uranyl nitrate from aqueous solutions, two steps are involved in recovering the uranium, namely:

(1) extraction from the solution containing uranyl nitrate into the polyether, and (2) extraction from the ether phase into water.

Various substances accompany the uranium in varying degrees upon extraction, among them being nitric acid. Since substances like iron are often present in solutions containing uranium, control of acid is an important factor in the recovery of uranium by extraction. Salts of iron and similar elements, hydrolyze in substantial degree in aqueous solution. Since a portion of the acid resulting from this hydrolysis distributes into the polyether phase and is removed upon extraction, insoluble hydroxides may precipitate in the aqueous phase unless suitable controls of acidity are established. Acid may be added to stabilize these solutions since excess acid within reasonable limits does not have any marked effect on the value of the uranium distribution coefficient (ether/water).

Once the uranyl nitrate is obtained as a polyether extract, there remains the problem of washing the uranium back into water. Here the influence of acid is of great importance since the reciprocal distribution coefficient for UO$_2$(NO$_3$)$_2$—water/polyether—is greatly reduced by the presence of acid. Sometimes it may even be necessary to neutralize most of the excess acid in the polyether phase in order to remove the uranium efficiently. With suitable control of conditions in step (1) of the process, the uranium may be recovered from the polyether phase without undue difficulty.

Since the terms "equivalent solution" and "excess acid" are used herein, their intended meanings will be set forth at this point. An equivalent solution is one in which total cations and anions are present in equivalent amount. This does not mean, however, that the solutions may not be acid, but the acid content may not exceed that due to the hydrolysis of salts, such as Fe(NO$_3$)$_3$. When part of the acid due to hydrolysis has been removed, as in extraction, or neutralized, as with a suitable base, the solution is termed "deficient" in acid. By "excess acid" is meant acid over and above that found in an equivalent solution. Acid resulting from hydrolysis of an equivalent solution is not considered to be excess acid. A solution deficient in acid is one in which anions have been removed as acid from an equivalent solution by extraction or by neutralization with a suitable base. Deficiency in acid may be designated as "negative excess acid."

From the foregoing discussion, it is apparent that control of acid is important in both steps of the extraction process:

(1) in the extraction from the aqueous solution containing uranyl nitrate into the polyether; and (2) in the recovery of UO$_2$(NO$_3$)$_2$ from the polyether phase by back extracting into water.

As was indicated above, the acid concentration during extraction into the polyether should be maintained at a high enough level so that precipitation will not occur in the aqueous phase. This condition may be satisfied by adding sufficient excess acid during extraction. However, the acid concentration in the polyether phase should be held to a minimum, since excess acid reduces the efficiency of the washback from ether to water. Extraction is best carried out under conditions where the aqueous solution containing uranyl nitrate remains very nearly equivalent, since it has been found that contacting an equivalent solution of practically any composition containing UO$_2$(NO$_3$)$_2$ with an equal volume of a polyether does not produce instability.

The exact procedure employed to maintain an equivalent solution during extraction depends upon whether a batchwise or columnwise extraction process is employed. In the batch process, acid, equivalent to that extracted, may be added to the aqueous phase after each pass with the polyether. When a column is employed, the best procedure is to add enough acid to the polyether phase before extraction so that acid will be neither removed by the polyether phase nor absorbed by the aqueous phase.

The concentration of acid in the polyether phase after contacting with an aqueous solution containing uranyl nitrate along with other salts varies in accordance with the following factors:

(a) the nature and concentration of the other salts present in the aqueous solution that contains uranyl nitrate along with said other salts;

(b) the concentration of salting out agent added to said aqueous solution;

(c) the amount of excess acid initially present in said aqueous solution;

(d) the ratio of the volumes of the two phases; and (e) the temperature.

Since batchwise and columnwise extractions are somewhat different in character, different methods of control should be imposed in order to operate efficiently. Batchwise extraction is carried out under equilibrium conditions, and the factors mentioned above, with affect the distribution of uranium and other substances, may be readily determined, and conditions of extraction controlled accordingly. In columnwise extraction, on the other hand, the condition of the two phases varies continuously from point to point along the length of the column; at no time is the system at equilibrium, rather, a steady state is arrived at, once the system is in operation. For example, if in countercurrent extraction from an aqueous solution containing uranyl nitrate along with other salts, a pure polyether is employed, the aqueous phase at the bottom of the column comes into contact with polyether containing no acid. Obviously, unless acid is added to the polyether at the start, acid will be extracted from the aqueous phase, and it may even become unstable and a precipitate form.

The nature of the other salts present in the aqueous solution containing uranyl nitrate is not readily controlled, but their concentrations may be regulated within reasonable limits. The single most important factor affecting the extraction of acid is control of the salting out agent concentration, since, other factors being the same, the acid coefficient increases roughly exponentially with increasing concentration of the salting out agent. Here again, the batchwise and columnwise extraction should be operated differently. In batchwise extraction, coefficients (ether/water) for UO$_2$(NO$_3$)$_2$ ranging from 150 to 200 usually are necessary in order to extract the uranium quantitatively after, say, three passes with the polyether. With a column, coefficients of from 20 to 50 are satisfactory depending upon the height of the column and other similar factors. In operating a column the higher the coefficient, the higher the acid concentration needed to maintain a stable aqueous phase during extraction. A high acid concentration in the polyether phase is detrimental to the step of stripping UO$_2$(NO$_3$)$_2$ from the polyether phase.

In preparing an aqueous solution containing uranyl nitrate and other salts for extraction, one of the most difficult factors to control is the amount of excess acid, since this depends largely upon the previous history of the solution. For example, if it has been necessary to concentrate the solution, a considerable excess of nitric acid may have been added to prevent precipitation of compounds of elements such as iron during the evaporation process. We have developed a fairly reliable method of estimating the excess acid in a solution of this type which makes it possible to determine whether or not to neutralize a portion of the excess acid before extraction. This method of estimating excess acid comprises the steps extracting the aqueous solution containing uranyl nitrate with a polyether, determining the equilibrium value for acid in the polyether phase by a simple titration, and from this result estimating the excess acid in the aqueous phase.

In ascertaining the amount of acid in the polyether phase, it has been found best to proceed as follows when the polyether employed is dibutoxydiethylene glycol. An aliquot of the polyether phase is titrated with a standard solution of n-amylamine in dibutoxydiethylene glycol using bromphenol blue as an indicator. The color changes from yellow to red when the end point is reached in the presence of uranium; in the absence of uranium the color change is from yellow to blue at the end point.

Acid is extracted by polyethers from aqueous solutions containing uranyl nitrate and salts that hydrolyze, such as ferric nitrate. If enough acid is extracted, these solutions may become unstable and deposit precipitates. The stability of a solution is dependent upon the degree of hydrolysis of the salts present, their concentration and nature and the excess or deficiency of acid. With considerable amounts of iron present, the solutions usually remain stable after several extractions; with smaller amounts of iron, the solutions may become unstable after a single extraction. This is particularly true if the distribution coefficient (ether/water) for $UO_2(NO_3)_2$ is high. At a given concentration of a hydrolyzable salt, such as $Fe(NO_3)_3$, the concentration of salting out agent determines the amount of acid which will be removed per pass with an extraction agent. The higher the concentration of salting out agent, the greater the amount of acid extracted and the more readily does the solution become unstable on extraction. As a rule, precipitation in an unstable solution does not occur immediately after extraction; consequently, it is possible to work with a solution deficient in acid provided that the extraction process is carried out fairly rapidly.

As indicated above, the acidity of the polyether phase increases with increasing concentration of salts which hydrolyze and with increasing concentration of salting out agents which hydrolyze inappreciably. By initially adding sufficient acid to the polyether used for extraction, it is possible to carry out the extraction without any loss of acid from the aqueous phase. If free nitric acid is added to the aqueous phase, it is largely salted into the organic phase in the presence of such salting out agents as calcium nitrate and cupric nitrate at the salt concentrations commonly used in extraction. With decreasing salt concentration the distribution coefficient (ether/water) for $HNO_3$ falls off in much the same fashion as does the distribution coefficient (ether/water) for $UO_2(NO_3)_2$, although the change is less marked.

The acid concentration in the polyether phase which is in equilibrium with an equivalent solution in the aqueous phase increases with increasing ferric nitrate concentration when the distribution coefficient (ether/water) for $UO_2(NO_3)_2$ is kept constant by suitably adjusting the amount of $Ca(NO_3)_2$ or other salting out agent used. When the aqueous phase is aproximately one-quarter saturated with respect to ferric nitrate and the distribution coefficient (ether/water) for $UO_2(NO_3)_2$ has a value of approximately 50, the acid concentration in the polyether phase will be approximately 0.5 N when the aqueous phase is extracted with an equal volume of polyether. Under these conditions, the aqueous phase may be maintained stable on extraction by employing polyether which has been made approximately 0.5 N in $HNO_3$. Less acid may be added to the polyether used for extraction if the ferric nitrate concentration in the aqueous phase is less than one-quarter saturated. The amount of acid going into the polyether phase from an aqueous phase containing $Fe(NO_3)_3$ increases rapidly as the concentration of salting out agent increases. Therefore, to prevent any precipitation of iron in the aqueous phase, it is desirable to carry out extraction with as low a concentration of salting out agent as practicable, particularly when a column is employed.

Extraction affords a method of estimating excess acid in aqueous solutions containing uranyl nitrate along with other metallic nitrates. The estimates are made by comparing the acid values in polyether extracts of aqueous solutions of unknown acidity containing $UO_2(NO_3)_2$ and other metallic nitrates with acid values of aqueous solutions of known acidity containing comparable amounts of uranyl nitrate and of the same other metallic nitrates.

The addition of free nitric acid to aqueous solutions containing uranyl nitrate and a salting out agent causes the distribution coefficient (ether/water) for uranyl nitrate to change. In the case of uranyl nitrate solutions which also contain 105 g. of calcium nitrate per 100 cc. of water as a salting out agent, it is found that the addition of free nitric acid causes the distribution coefficient (ether/water) for $UO_2(NO_3)_2$ to rise up to the point where the added nitric acid has a concentration of 1 N in the polyether phase. The addition of further nitric acid causes the distribution coefficient to fall from the maximum value it attains when the concentration of acid in the polyether phase is 1 N. The addition of free nitric acid also causes the volume of the organic phase to increase. Experiments on the extraction of $UO_2(NO_3)_2$ from an aqueous solution containing it and $Fe(NO_3)_3$, $Cu(NO_3)_2$ and $CuCl_2$ showed that the distribution coefficient (ether/water) for $UO_2(NO_3)_2$ was not greatly affected by the addition of $HNO_3$ to the aqueous phase when the aqueous phase was extracted with an equal volume of the dibutyl ether of diethylene glycol. When equal volumes of the two phases are employed in the extraction process, the distribution coefficient for $UO_2(NO_3)_2$ does not change sufficiently to affect the extraction process significantly over the range of acid concentrations ordinarily encountered.

As in the initial extraction into a polyether, the backwash of $UO_2(NO_3)_2$ from the polyether phase into water may be carried out either in a column or in batches. As was pointed out above, the presence of acid adversely affects the recovery of $UO_2(NO_3)_2$. When the back-washing is done batchwise, the usual practice is to incorporate base into the first water wash so as to neutralize most of the excess acid which is in the polyether phase. When this is done, the residual concentration of acid in the polyether phase is of no concern; hence, the $UO_2(NO_3)_2$ may be removed with little difficulty and the back-wash operation presents no particular problem. On the other hand, no adjustment of acidity can be made in the column itself when a column is employed in the back wash operation; hence, unless the acidity is adjusted before the polyether solution is run through the column, very extensive washing is required with the result that large volumes of solution may have to be handled.

In the batchwise process, acid may also be removed from the polyether extract by a preliminary washing of the polyether phase with a small volume of a concentrated solution of a salting out agent, such as $Ca(NO_3)_2$, containing enough base to neutralize excess acid. This method possesses the advantage that impurities such as iron are largely removed while very little $UO_2(NO_3)_2$ is extracted, and what $UO_2(NO_3)_2$ is removed may be readily recovered by extraction.

As indicated above, the presence of excess acid in polyether solutions containing $UO_2(NO_3)_2$ decreases the partition of $UO_2(NO_3)_2$ into water in the stripping or back-washing operation, thereby necessitating more extensive back-washing to remove the uranium quantitatively from the polyether phase. In a series of experiments in which aqueous solutions containing known amounts of $UO_2(NO_3)_2$ and $HNO_3$ were shaken with equal volumes of dibutoxydiethylene glycol, it was found that the distribution coefficients (water/ether) for $UO_2(NO_3)_2$ decrease rapidly as the acid concentration increases, since excess acid tends to salt the $UO_2(NO_3)_2$ into the polyether phase. From this observation, it may be seen the $UO_2(NO_3)_2$ may be most readily stripped from a polyether solution thereof with water by neutralizing as much of the excess acid as is practicable. In a batchwise stripping operation, this may be done readily by incorporating a base such as ammonium hydroxide in the water wash. In practice, four washes with water are usually employed, the volume of each water wash being equal to about one-fourth the volume of the polyether phase in order to minimize the amount of water used to strip the $UO_2(NO_3)_2$. Base is employed in the first wash only. When the operation is conducted according to this scheme, advantage is automatically taken of the fact that the distribution of $UO_2(NO_3)_2$ into water becomes more favorable as the concentration of the uranyl nitrate decreases.

In the same series of experiments which was mentioned in the preceding paragraph, it was found that the distribution coefficient (water/ether) for $HNO_3$ decreased as the $HNO_3$ concentration was increased. It was also found that $HNO_3$ was extracted more readily from the polyether phase when the $UO_2(NO_3)_2$ concentration was low. Accordingly in the batchwise stripping process, where four washes with water are employed, the conditions favoring the removal of $UO_2(NO_3)_2$ from the polyether phase become increasingly more favorable on successive passes, since as a larger fraction of the $HNO_3$ is removed from the polyether phase and the concentration of $UO_2(NO_3)_2$ therein decreases, the back wash of $UO_2(NO_3)_2$ into subsequent water washes proceeds with increased efficiency.

From the results of these experiments, it may be seen that control of acid concentration in connection with the washback of $UO_2(NO_3)_2$ from the polyether phase into water is desirable to insure satisfactory operation of the batchwise extraction process. As indicated above, the usual practice in the batchwise extraction process is to neutralize most of the excess acid in the polyether phase by employing base in the first water wash. Usually most of the acid in the polyether phase is thus neutralized; by doing this the recovery of $UO_2(NO_3)_2$ from the polyether phase is essentially quantitative after three or four washes with portions of water each having a volume equal to about one-quarter of the volume of the polyether phase. When working with solutions of $UO_2(NO_3)_2$ which vary considerably from batch to batch in their content of free acid and other salts, it is desirable to determine the acidity of the polyether phase after each extraction and before starting to wash the $UO_2(NO_3)_2$ from the polyether phase back into water. With $UO_2(NO_3)_2$ solutions which are more or less of uniform composition in so far as their content of excess acid and salting out agent is concerned, the procedure for performing a batch extraction may be readily standardized.

The influence of acid on the stripping of $UO_2(NO_3)_2$ from a polyether solution with water may be summarized as follows: The distribution coefficient (water/ether) for $UO_2(NO_3)_2$ is greatly dependent upon the concentration of acid and this holds true also for the distribution coefficient (water/ether) for $HNO_3$ itself. At high acid concentrations, the coefficients for both substances reach extremely low values. At low acid concentrations, the distribution of both $UO_2(NO_3)_2$ and $HNO_3$ into water becomes extremely favorable. Therefore, the acidity of the polyether phase should be held to a minimum in the initial extraction operations. When possible the acidity of the polyether phase should be adjusted to nominal values before washing with water or by including an appropriate amount of a suitable neutralizing agent in the first water wash.

In the examples and discussion above, mention has been made of the use of aqueous solutions of $NH_4NO_3$, $Ca(NO_3)_2$ and $Cu(NO_3)_2$ for washing polyether extracts to remove traces of iron therefrom. Aqueous solutions of $Zn(NO_3)_2$ and $Al(NO_3)_3$ may also be used for this same purpose. The following paragraphs discuss the use of these nitrate wash solutions for decreasing the iron content of the polyether phase.

*Nitrate wash solutions for removing iron from polyether extracts*

As may be seen from the above examples and discussion, any iron which enters the polyether phase may be removed therefrom by washing the polyether phase with a small volume of a suitable nitrate solution containing enough salting out agent to keep most of the $UO_2(NO_3)_2$ in the polyether phase. Various salting out agents have been used for this purpose, among them $NH_4NO_3$, $Ca(NO_3)_2$, $Cu(NO_3)_2$ and $Zn(NO_3)_2$ solutions. $Ca(NO_3)_2$ solutions are effective for this purpose only when the polyether phase is essentially free from chloride ions. If the polyether phase contains both ferric and chloride ions, it is necessary to employ nitrate wash solutions containing $Cu(NO_3)_2$ or $Zn(NO_3)_2$ to remove the iron from the polyether phase. Both $Ca(NO_3)_2$ and $Zn(NO_3)_2$ solutions are effective for removing any copper which may have become dissolved in the polyether phase. Copper nitrate is the most effective salt to use in a wash-back operation for iron, although zinc nitrate approaches copper nitrate in effectiveness. Calcium nitrate solutions used for removing iron from the polyether phase preferably contain equal parts by weight of this salt and water. Copper nitrate and zinc nitrate solutions used for removing iron are preferably made up to contain three parts by weight of the respective nitrate for every four parts by weight of water. The concentration of nitrates in the wash-back solution is sufficiently high so that only a small fraction of the uranium in the polyether phase is extracted into the wash-back solution. However, the concentration of nitrates in the nitrate wash-back solution should not be made too high or the iron will not be efficiently washed out of the polyether phase. Generally, the polyether phase is washed twice with two portions of a nitrate wash solution having but one-tenth of the volume of the polyether phase.

In analytical procedures wherein dibutoxytetraethylene glycol is used as the extraction solvent, it is preferred to use an approximately three-quarters saturated $NH_4NO_3$ solution (160 g. per 100 cc. of water) as a nitrate wash solution to remove iron from the polyether phase instead of a solution of a metallic nitrate.

In the following paragraphs the use of an $Al(NO_3)_3$ wash solution which contains some $Al(OH)_3$ as a neutralizing agent is described.

As has been mentioned in the examples herein, one method of reducing the acidity of a polyether extract before stripping the uranium therefrom by water washing is to incorporate a sufficient amount of a base, such as $NH_4OH$, in the nitrate wash solution which is employed to remove iron from said polyether extract. However, if the acidity of the polyether extract has been incorrectly determined or if too much base is inadvertently added to the nitrate wash solution, there is a possibility that some of the uranium will precipitate in the nitrate wash solution.

It has been found that $Al(OH)_3$, while it is a strong enough base to neutralize excess $HNO_3$ in $UO_2(NO_3)_2$ solutions, is still weak enough so that the use of an excess thereof will not cause precipitation of uranium from $UO_2(NO_3)_2$ solutions. It has also been found that $Al(OH)_3$ dissolves in solutions containing $Al(NO_3)_3$ to form macroscopically homogeneous solutions since the $Al(OH)_3$ is probably peptized in the presence of $Al(NO_3)_3$ to form a sol. The use of a nitrate wash solution containing $Al(NO_3)_3$ as the salting-out agent and a dissolved $Al(OH)_3$ sol as the neutralizing agent has been tested for its efficacy in neutralizing acid and removing iron from a polyether extract.

In preparing a wash solution containing $Al(NO_3)_3$ and a dissolved $Al(OH)_3$ sol, it was found convenient to add a base, such as NaOH, to a concentrated aqueous solution of $Al(NO_3)_3$, making certain that enough $Al(NO_3)_3$ remains in solution to give a satisfactory distribution coefficient (ether/water) for the $UO_2(NO_3)_2$. In utilizing such a nitrate wash solution for neutralizing acid and removing iron from a polyether extract, the following experiment was carried out.

A solution was prepared by adding 22 g. of $Fe(NO_3)_3$, 75 g. of $Ca(NO_3)_2$, 1 g. of Cl (added as $CaCl_2$) and 2.5 g. of U (added as $UO_2(NO_3)_2$) to 100 cc. of water. This solution was extracted with an equal volume of dibutoxydiethylene glycol. The polyether extract thus obtained contained 2.3 g. of U and 0.11 g. of Fe per 100 cc. and was 0.27 N in excess acid. This polyether extract was then washed twice successively with one-quarter of its volume of a nitrate wash solution made from 17.1 g. of NaOH, 127.8 g. of $Al(NO_3)_3 \cdot 9H_2O$ and 21.6 g. of $H_2O$ (and which after reaction of the ingredients was composed of 47.4 g. of $NaNO_3$, 55 g. of $Al(NO_3)_3$, 14.5 g. of $Al(OH)_3$ and 100 g. of $H_2O$). The $Al(OH)_3$ in this nitrate wash solution was completely peptized and passed into solution after a few minutes of vigorous stirring. This nitrate wash solution was approximately 4.25 N in base, and hence was capable of neutralizing approximately 1N acid in the polyether extract with a 1:4 volume ratio of phases as employed in the present experiment. Actually, therefore, the $Al(OH)_3$ concentration was roughly threefold in excess of that required to neutralize the acid in the polyether extract.

During the first wash with this aluminum nitrate solution, the temperature rose above room temperature to 34° C. due to the heat evolved in the neutralization of acid. After the first wash with the nitrate solution, it was found that the iron concentration in the polyether extract had been reduced to 0.0043 g. per 100 cc. and the acidity of the polyether phase to 0.019 N. After the second pass with the nitrate solution, it was found that the iron content of the polyether phase had become negligible and its acidity had dropped to 0.012 N. The distribution coefficient (ether/water) for $UO_2(NO_3)_2$ had a minimum value of 160 during these washings. This experiment clearly showed that $Al(OH)_3$ in conjunction with $Al(NO_3)_3$ solutions could be satisfactorily employed for reducing the acidity and iron content of polyether extracts containing uranium without demanding the strict control of conditions which were necessary when stronger bases are used.

$Al(OH)_3$ sols in aqueous $Al(NO_3)_3$ solutions may be prepared in several ways. Freshly precipitated $Al(OH)_3$ is completely peptized by fairly concentrated $Al(NO_3)_3$ solutions after shaking for from 12 to 24 hours. This method has the drawback that it is time consuming. Solid $Al(NO_3)_3 \cdot 9H_2O$ may be mixed with a concentrated NaOH solution to form this $Al(OH)_3$ sol as mentioned in the experiment discussed in the preceding paragraphs. Solid $Al(NO_3)_3 \cdot 9H_2O$ may be added to a solution of sodium aluminate to form this $Al(OH)_3$ sol. Use of a sodium aluminate solution is advantageous since a given amount of $Al(OH)_3$ can be formed while introducing only one-fourth as much $NaNO_3$ into the sol as when NaOH is used. This $Al(OH)_3$ sol may also be formed by adding water to a mixture of $Al(NO_3)_3 \cdot 9H_2O$ and $Ca(OH)_2$. However prepared, these $Al(OH)_3$ sols in $Al(NO_3)_3$ solutions are useful in the present invention for neutralizing acid and removing iron from polyether extracts containing uranium.

It has been possible to prepare sols containing 13.5 to 14.4 g. of $Al(OH)_3$ per 100 cc. of water and also containing 14.3 g. of $NaNO_3$ and from 20.8 to 63.8 g. of $Al(NO_3)_3$ per 100 cc. of water by adding solid $Al(NO_3)_3 \cdot 9H_2O$ to solutions of sodium aluminate. In other words, these sols are roughly 4 N in base.

The presence of the $Al(OH)_3$ sol in these aqueous solutions of $Al(NO_3)_3$ and $NaNO_3$ lowers the distribution coefficient (ether/water) for $UO_2(NO_3)_2$. However, this lowering of the distribution coefficient is offset in most instances by the fact that the free $HNO_3$ in the polyether extract reacts with the $Al(OH)_3$ to produce more $Al(NO_3)_3$, which in turn raises the distribution coefficient (ether/water) for $UO_2(NO_3)_2$.

For maximum efficiency, the sol should be as concentrated as possible, which means having an $Al(OH)_3$ concentration of approximately 14.5 g. per 100 cc. of water, which is equivalent to 4.3 N in base. On complete neutralization, 14.5 g. of $Al(OH)_3$ would yield approximately 40 g. of $Al(NO_3)_3$. Hence, in order to prevent salts from crystallizing out, the $Al(NO_3)_3$ concentration in the sol initially should not exceed approximately 30 g. per 100 cc. of water.

In the following paragraphs, there is a discussion of the effect of sulfate ions on the distribution of $UO_2(NO_3)_2$ between aqueous and polyether phases. After introductory remarks showing how $UO_2(NO_3)_2$ is partitioned between aqueous and polyether phases in the absence of salting out agents, free $HNO_3$ and sulfate ions, it is shown how sulfate ions aid in the stripping of $UO_2(NO_3)_2$ from a polyether phase and what steps must be taken to overcome the adverse effects of sulfate ions when it is desired to extract $UO_2(NO_3)_2$ from an aqueous solution in which the predominant anion is the nitrate ion but which also contains sulfate ions by means of a dialkyl ether of a polyethylene glycol.

*Effect of sulfate ions on the distribution of $UO_2(NO_3)_2$ between aqueous and polyether phases*

The distribution of $UO_2(NO_3)_2$ between water and dibutoxydiethylene glycol and dibutoxytetraethylene glycol in the absence of free nitric acid and any salting out agents is shown in the following table:

| Solvent | g. of U per 100 cc. Phase | | Distribution Coefficients | |
| --- | --- | --- | --- | --- |
| | Ether | Water | Water/Ether | Ether/Water |
| Dibutoxydiethylene glycol | 0.296 | 10.1 | 34.1 | 0.03 |
| | 0.050 | 5.03 | 100 | |
| | 0.0352 | 4.69 | 133 | |
| | 0.0036 | 2.12 | 590 | 0.0017 |
| | 0.00006 | 0.505 | 8,700 | |
| Dibutoxytetraethylene glycol | 0.229 | 3.95 | 17.3 | 0.06 |
| | 0.001 | 0.222 | 100 | 0.004 |

The low value of the distribution coefficients (ether/water) for $UO_2(NO_3)_2$ given in the above table show why it is imperative to add salting out agents to aqueous solutions containing $UO_2(NO_3)_2$ in order to obtain an adequate distribution of the uranyl nitrate into the polyether phase.

As may be seen from the above table, the distribution of $UO_2(NO_3)_2$ into the aqueous phase is increasingly more favorable as the concentration of $UO_2(NO_3)_2$ is decreased. This feature makes it possible to recover the uranium quantitatively from the polyether phase by washing with water after extraction. The recovery of uranium from the polyether phase would have been difficult if the distribution coefficient (water/ether) for $UO_2(NO_3)_2$ decreased with decreasing uranium concentration.

It has been found that $UO_2(NO_3)_2$ may be more readily extracted from the polyether phase by an aqueous $(NH_4)_2SO_4$ solution than by pure water, a fact which has been advantageously utilized in analytical work. Apparently the uranyl ion associates with the sulfate ion to form a complex which is very insoluble in polyethers. It has been found that the distribution coefficient (water/ether) for $UO_2(NO_3)_2$ between an ammonium sulfate solution containing 77 g. of $(NH_4)_2SO_4$ per 100 cc. of water and dibutoxytetraethylene glycol is about 3000 in the absence of any free nitric acid or salting out agents, whereas the value of this distribution coefficient falls to less than 100 when $(NH_4)_2SO_4$ is completely eliminated from the aqueous phase. It has also been found that while the distribution coefficient (water/dibutoxydiethylene glycol) for a fairly concentrated solution of $UO_2(NO_3)_2$ has a value of 35, the value of this distribution coefficient rises to 270 when the aqueous phase contains 10 g. of $(NH_4)_2SO_4$ per 100 cc. of water, goes to 1890 when the aqueous phase contains 25 g. of $(NH_4)_2SO_4$ per 100 cc. of water, and becomes greater than 40,000 when the aqueous phase contains from 32 to 77 g. of $(NH_4)_2SO_4$ per 100 cc. of water. The practicability of using an $(NH_4)_2SO_4$ solution to recover uranium from a polyether phase is made evident from the information just recited. With distribution coefficients of the order of those mentioned, it is possible to remove the uranium completely from the polyether phase by washing with only a small relative volume of an aqueous $(NH_4)_2SO_4$ solution.

As compared with water, only a small volume of an $(NH_4)_2SO_4$ solution is required to a strip the $UO_2(NO_3)_2$ from the polyether phase. The distribution of $UO_2(NO_3)_2$ from the polyether phase into an aqueous ammonium sulfate solution is extremely favorable even in the presence of fairly large amounts of excess $HNO_3$, which is not the case when pure water is used in place of an ammonium sulfate solution. With a half-saturated $(NH_4)_2SO_4$ solution (38 g. of $(NH_4)_2SO_4$ per 100 cc. of water), the distribution coefficient (water/ether) for $UO_2(NO_3)_2$ increased from 70 to 8900 as the $HNO_3$ concentration of the dibutoxydiethylene glycol phase was lowered from 1 N to 0.25 N, and attained a value of 140,000 when acid was omitted from the polyether phase. The coefficients are even higher when more concentrated ammonium sulfate solutions are used. The partition coefficients are sufficiently large so that small amounts of uranium can be recovered quantitatively by washing 10 liters of a polyether phase with one or two 100 to 200 cc. portions of an aqueous $(NH_4)_2SO_4$ solution.

Sodium sulfate solutions may be used in place of ammonium sulfate solutions; however, $Na_2SO_4$ is not as soluble as $(NH_4)_2SO_4$ and, furthermore, the introduction of sodium ions into the system is often disadvantageous as, for example, in analytical procedures where it is desired to determine the uranium gravimetrically.

As shown in the preceding paragraphs, the presence of the sulfate ion improves the distribution of uranium into the aqueous phase. This is advantageous when one wishes to strip uranium from a polyether phase, but is a distinct disadvantage when one wishes to extract the uranium from an aqueous solution containing dissolved uranyl and sulfate ions. One remedy for this situation is to precipitate the sulfate ion from the aqueous solution as barium sulfate, which is removed by filtration prior to extraction.

Another remedy for this situation is to add enough $NH_4OH$ to the aqueous solution to precipitate all the uranium therefrom, followed by washing of the precipitate free from sulfate ion and the use of nitric acid to dissolve the precipitate. This yields an aqueous solution of metal nitrates from which the $UO_2(NO_3)_2$ may be readily extracted by means of polyethers. The aqueous solution containing uranium may have fluoride and chloride ions removed therefrom by a similar precipitation and washing procedure. The fluoride ions, as discussed below, interfere with the polyether extraction of $UO_2(NO_3)_2$. The chloride ions, as discussed elsewhere herein, while they do not appear to have much effect upon the distribution of $UO_2(NO_3)_2$, do tend to increase the amount of iron extracted by the polyether.

A simpler way to nullify the adverse effects of sulfate ions on the distribution of $UO_2(NO_3)_2$ into the polyether phase is to employ ferric nitrate in the aqueous solution which contains $UO_2(NO_3)_2$ and sulfate ions. The distribution coefficient (ether/water) for $UO_2(NO_3)_2$ has a value of 260 at room temperature when 160 g. of $NH_4NO_3$ per 100 cc. of water is used as the salting out agent and dibutoxytetraethylene glycol is employed as the extraction solvent. If to the foregoing aqueous solution, there is added 17.4 g. of $(NH_4)_2SO_4$ per 100 cc. of water, the distribution coefficient (ether/water) for $UO_2(NO_3)_2$ drops to a value of 0.026. However, if to the foregoing aqueous solution, there is added both 17.3 g. of $(NH_4)_2SO_4$ and 23.8 g. of $Fe(NO_3)_3$ per 100 cc. of water, the distribution coefficient (ether/water) for $UO_2(NO_3)_2$ rises back to a value of 98.5. As may be seen from this information, the sulfate ion causes the uranium to be comparatively insoluble in the polyether phase even though a considerable amount of salting out agent is employed. Of particular significance is the fact that in the presence of enough ferric ion, the sulfate ion does not exert such a marked influence on the uranium distribution. Apparently the sulfate ion forms a more stable complex with the ferric ion than it does with the uranyl ion.

The distribution coefficient (ether/water) for $$UO_2(NO_3)_2$$

is reduced considerably by sulfate ion in the absence of $Fe(NO_3)_3$ even in the presence of substantial amounts of most salting out agents. However, when $Fe(NO_3)_3$ is added in substantial amount, the effect of sulfate ion is overcome, and no difficulty is experienced in recovering the uranium by extraction.

It has been found, however, that if the sulfate ion concentration is fairly low in the aqueous solution from which uranium is to be extracted, as is the case when said aqueous solution is saturated with $CaSO_4$ and no other substance yielding sulfate ions is present, no interference with the extraction of uranium from said aqueous solution is noted.

In general, the sulfates of metals such as Ca, Cu or Al, the nitrates of which are used as salting out agents, are not very soluble, with the result that not enough salting out agent can be put into a solution containing sulfate ions to yield a satisfactory distribution coefficient (ether/water) for uranium without appearance of a metal sulfate precipitate. Ferric sulfate, on the other hand, is quite soluble, and as may be seen from the information given above, more than enough $Fe(NO_3)_3$ may be dissolved to yield uranium distribution coefficients acceptable for batchwise extraction when the sulfate ion concentration is as high as 12.4 g. per 100 cc. of water, which is equivalent to 17 g. of $(NH_4)_2SO_4$ per 100 cc. of water.

It has been found that for aqueous solutions containing 2.5% of uranium and 11.5 g. of $Fe_2(SO_4)_3$ per 100 cc. of water the distribution coefficient (ether/water) for uranium at room temperature using dibutoxy-diethylene glycol as the extraction solvent attains a value of 65 when 56 g. of $Fe(NO_3)_3$ per 100 cc. of water is present as a salting out agent and a value of 222 when 75 g. of $Fe(NO_3)_3$ per 100 cc. of water is present. Furthermore, using dibutoxydiethylene glycol as the extraction solvent and a 2.5% uranium solution containing 5.8 g. of $Fe_2(SO_4)_3$ per 100 cc. of water, it has been found that the distribution coefficient (ether/water) for uranium at room temperature has a value of 95 when 63 g. of $Fe(NO_3)_3$ per 100 cc. of water is used as a salting out agent and attains a value of 205 when 75 g. of Fe(NO₃)₃ per 100 cc. of water is employed as a salting out agent. Comparison of these distribution coefficients with coefficients obtained with solutions from which Fe₂(SO₄)₃ has been omitted has shown that the presence of a moderate amount of sulfate ion does not interfere with the recovery of uranium by extraction when ferric nitrate is employed as the salting out agent.

Fluoride ions also interfere with the polyether extraction of UO₂(NO₃)₂ from aqueous solutions unless salting out agents are used which overcome the adverse effect of the fluoride ions. The following paragraphs describe how UO₂(NO₃)₂ may be effectively extracted by means of a dibutyl ether of a polyethylene glycol from aqueous solutions which contain fluoride ions but in which the predominant anion after the addition of the salting out agent is the nitrate ion.

*Recovery of uranyl nitrate from aqueous solutions containing fluoride ions*

Fluoride ions interfere with the extraction of UO₂(NO₃)₂ from an aqueous solution by polyethers unless either Al(NO₃)₃ or Ca(NO₃)₂ or a mixture of these two nitrates is added to the aqueous solution to nullify the effect of the fluoride ions. In the presence of fluoride ions, Al(NO₃)₃ has proved exceptionally satisfactory as a salting out agent for use in the recovery of UO₂(NO₃)₂ by extraction with dibutoxydiethylene glycol. The aluminum ions effectively tie up the fluoride ions, allowing the uranium to be extracted without a measurable amount of fluoride going over into the polyether phase. The addition of Ca(NO₃)₂ to an aqueous solution containing Al(NO₃)₃ greatly increases the distribution coefficient (ether/water) for UO₂(NO₃)₂.

Extraction may advantageously be employed for the recovery of uranium from solutions obtained by adding UF₆ to water or from the effluents resulting from processes based on chemical methods for recovering uranium from such solutions, such as effluents resulting from uranium peroxide precipitations. Before extraction or precipitation, the excess HF in solutions obtained by adding UF₆ to water is first neutralized with a suitable base. The most suitable base to use prior to an extraction with a polyether using Al(NO₃)₃ as the salting out agent is NaOH.

When a uranyl nitrate solution containing 65 g. of Al(NO₃)₃ per 100 cc. of water as a salting out agent and also containing 3.1 g. of F per 100 cc. of the aqueous phase was extracted with an equal volume of dibutoxydiethylene glycol, it was found that the distribution coefficient for UO₂(NO₃)₂ (ether/water) was 95 when the F in solution was present as KF, was 128 when the F was present as NH₄F, and was 229 when the F in solution was present as NaF. These results show why NaOH is preferred as a base for neutralizing excess HF in solutions containing uranium which are to be extracted with polyethers. Substantially no Al or F is extracted under the conditions employed in these distribution experiments.

The distribution coefficients (ether/water) for

UO₂(NO₃)₂ for aqueous solutions which were fully saturated with Al(NO₃)₃ and which contained from 1.35 g. to 6.46 g. of F (added as NaF) and approximately 2 g. of U (added as UO₂(NO₃)₂) per 100 cc. of solution were determined employing dibutoxydiethylene glycol as the extraction solvent. It was found that the distribution coefficient rose from a value of 730 when 1.35 g. of F per 100 cc. of solution were present to a value of 1170 when 2.86 g. of F per 100 cc. of solution were present and then fell to a value of 163 when 6.46 g. of F per 100 cc. of solution were present. These values of the distribution coefficients indicate that extraction methods are entirely feasible for removing uranium from aqueous solutions containing fluoride ions when Al(NO₃)₃ is employed as the salting out agent and dibutoxydiethylene glycol is the extraction solvent. The change in the value of the distribution coefficient for UO₂(NO₃)₂ appears to be due in part to the fact that the solubility of Al(NO₃)₃ in NaF solutions at first increases as the NaF concentration is increased, reaches a maximum at an F concentration of about 3 g. per 100 cc. of solution, and then decreases.

The distribution coefficients (ether/water) for

UO₂(NO₃)₂ were determined for solutions which also contained approximately 3 g. of F (added as NaF) per 100 cc. of solution and from 60 to 78 g. of Al(NO₃)₃ per 100 cc. of water as the salting out agent. Dibutoxydiethylene glycol was employed as the extraction solvent in all cases. It was found that the distribution coefficient rose from a value of 148 when 60 g. of Al(NO₃)₃ per 100 cc. of water were present to a value of 303 when 68 g. of Al(NO₃)₃ per 100 cc. of water were present and finally attained a value of 1072 when 78 g. of Al(NO₃)₃ per 100 cc. of water were present. From this data it can be seen that the distribution coefficient (ether/water) for UO₂(NO₃)₂ is sufficiently high to enable satisfactory batch extractions of UO₂(NO₃)₂ to be made from solutions containing fluoride ions when Al(NO₃)₃ is employed as the salting out agent. These distribution coefficients attain exceedingly high values even though fluoride ions are present when the solutions being extracted are nearly saturated with Al(NO₃)₃.

The distribution coefficients (ether/water) for UO₂(NO₃)₂ were determined for solutions which also contained 65 g. of Al(NO₃)₃ per 100 cc. of water as the salting out agent and from 2 to 5 g. of F (added as NaF after the addition of the salting out agent) per 100 cc. of solution. Dibutoxydiethylene glycol was employed as the extraction solvent. It was found that increasing the F concentration from 2 g. to 5 g. per 100 cc. of the aqueous phase decreased the distribution coefficient from a value of 310 to a value of 182. Although this decrease is appreciable, the distribution coefficient at 5 g. of F is still high enough that satisfactory batch extraction of UO₂(NO₃)₂ may be obtained from an aqueous solution containing so great a fluorine concentration.

The distribution coefficients (ether/water) for UO₂(NO₃)₂ were determined for solutions which also contained mixtures of Al(NO₃)₃ and Ca(NO₃)₂ as salting out agents and approximately 3 g. of F (added as NaF) per 100 cc. of the solution. Using dibutoxydiethylene glycol as the extraction solvent and 65 g. of Al(NO₃)₃ and 25 g. of Ca(NO₃)₂ per 100 cc. of water as the salting out agent, it was found that the distribution coefficient (ether/water) for UO₂(NO₃)₂ was 577. Under the same conditions when the amount of salting out agent used was increased to 65 g. of Al(NO₃)₃ and 75 g. of Ca(NO₃)₂ per 100 cc. of water, the distribution coefficient rose to a value of 2440. Using dibutoxytetraethylene glycol as the extraction solvent and employing 65 g. of Al(NO₃)₃ and 75 g. of Ca(NO₃)₂ per 100 cc. of water as the salting out agent, it was found that the distribution coefficient attained a value greater than 3600. These high values for the distribution coefficients (ether/water) for UO₂(NO₃)₂ show the value of using mixtures of Al(NO₃)₃ and Ca(NO₃)₂ as salting out agents in aqueous solutions containing fluoride ions from which UO₂(NO₃)₂ is to be extracted.

It has been found that a mixture of Ca(NO₃)₂ and Al(NO₃)₃ is an effective salting out agent for use in the quantitative determination of traces of uranium in solutions containing fluoride ions. A solution was made up to contain 30 g. of fluorine and 0.0116 g. of uranium per liter and also contained 57.5 g. of Al(NO₃)₃ and 27 g. of Ca(NO₃)₂ for each 100 cc. of water used in its preparation. This solution was extracted once with an equal volume of dibutoxydiethylene glycol. After the phases were separated, the uranium was removed from the organic phase by means of an aqueous $(NH_4)_2SO_4$ solution, and the uranium determined gravimetrically in accordance with the procedure discussed above in this specification under the heading, "The Analytical Determination of Uranium Employing Extraction Procedures." It was found that 0.0115 g. or 99% of the uranium was recovered in this experiment.

A series of determinations was carried out with $Ca(NO_3)_2$ as salting out agent to ascertain the effect of the fluorine concentration upon the distribution coefficient (ether/water) for $UO_2(NO_3)_2$ in solutions in which the fluoride ion was introduced as KF and 125 g. of $Ca(NO_3)_2$ per 100 cc. of water was employed as the salting out agent. It was found that the distribution coefficient for $UO_2(NO_3)_2$ decreased rapidly with increasing F concentration going from 168 when 0.36 g. of F per 100 cc. of solution is present to a value of 80 when 2.7 g. of F per 100 cc. of solution is present. It is obvious that $Al(NO_3)_3$ is much superior to $Ca(NO_3)_2$ as a salting out agent for $UO_2(NO_3)_2$ in the presence of fluoride ions.

If the concentration of fluorine is less than 1 g. per 100 cc. of solution, $Ca(NO_3)_2$ may be effectively used as a salting out agent for $UO_2(NO_3)_2$. This was shown by some experimental work in which an approximately 5% solution of uranium containing NaF was extracted with dibutoxydiethylene glycol after $Ca(NO_3)_2$ had been added to the solution as a salting out agent. $UF_6$ was run into water to obtain a 7.5% solution thereof. Enough of an NaOH solution was added to this solution to neutralize most of the free HF which had come into existence due to the hydrolysis of the $UF_6$. Following neutralization, $Ca(NO_3)_2 \cdot 4H_2O$ was added to the solution as salting out agent in an amount ranging from 110 to 138 g. of anhydrous $Ca(NO_3)_2$ per 100 cc. of water. The precipitate of $CaF_2$, which formed initially, dissolved as the solution became more concentrated in $Ca(NO_3)_2$, and a perfectly clear solution was formed when the solution was approximately 70% saturated with respect to $Ca(NO_3)_2$ (95 g. per 100 cc. of water). When such a solution containing about 5% uranium and 0.7 g. of F per 100 cc. was extracted with dibutoxydiethylene glycol in the presence of 135 g. of $Ca(NO_3)_2$ per 100 cc. of water as the salting out agent, it was found that the distribution coefficient (ether/water) for $UO_2(NO_3)_2$ was 473. When a similar solution containing but 125 g. of $Ca(NO_3)_2$ per 100 cc. of water was extracted it was found that the distribution coefficient of $UO_2(NO_3)_2$ (ether/water) was 203. As may be seen, these distribution coefficients for $UO_2(NO_3)_2$ are sufficiently large to show that uranium could be extracted readily by a batchwise process from a solution containing less than 1 g. of F per 100 cc. using dibutoxydiethylene glycol as the extraction solvent and $Ca(NO_3)_2$ as the salting out agent. The distribution coefficients obtained in these experiments are of the same order of magnitude as those obtained with nitrate solutions free of fluoride ions. Apparently, under the conditions of these experiments, the presence of fluoride ions does not measureably affect the extraction of uranium.

The $UO_2(NO_3)_2$ extracted in these experiments was washed from the ether phase with water. $NH_4OH$ was added to this water wash and the uranium was precipitated therefrom as $(NH_4)_2U_2O_7$. It was found that this precipitated $(NH_4)_2U_2O_7$ contained only 50 to 150 parts per million of fluorine. The amount of fluorine impurity in this precipitate depends upon the amount of care taken in separating the aqueous and organic layers during extraction from the fluoride solution.

It has been found that $Ca(NO_3)_2$ is an effective salting out agent for use in the quantitative determination of traces of uranium in solutions containing fluoride ions. Ten liters of solution containing 0.0099 g. of uranium and 70 g. of fluorine and also containing 130 g. of $Ca(NO_3)_2$ per 100 cc. of water used in its preparation were extracted with an equal volume of dibutoxydiethylene glycol. After the phases were separated, the uranium was removed from the organic phase by means of an aqueous $(NH_4)_2SO_4$ solution and the uranium determined gravimetrically in accordance with the procedure discussed above in this specification under the heading, "The Analytical Determination of Uranium Employing Extraction Procedures." It was found that 0.0098 g. or 99% of the uranium was recovered in this experiment.

It is advantageous to strip uranium from the polyether phase by washing with water that is warm rather than cool, since the distribution coefficient (water/ether) for $UO_2(NO_3)_2$ increases as the temperature rises. When water is used to strip $UO_2(NO_3)_2$ from a 5% solution of $UO_2(NO_3)_2$ in dibutoxydiethylene glycol, it has been found that the distribution coefficient (water/ether) for $UO_2(NO_3)_2$ rises from a value of 79.6 at 15° C. to a value of 218 at 35° C.

In the various extraction operations comprehended by the present invention, the ratio of the volumes of the two phases may vary from 1:1 to 100:1. The latter ratio is made use of when 100 cc. of an $(NH_4)_2SO_4$ solution is used to extract traces of uranium from 10 liters of a polyether phase. Except for this analytical procedure for the determination of traces of uranium, it is usual for the ratio of the volumes of the two phases to vary in the range from 1:1 to 1:10.

Resort may be had to such modifications and variations as fall within the spirit of the invention and the scope of the appended claims.

We claim:

1. A process of separating uranyl nitrate from an aqueous solution also containing at least one other metal in solution and in which the predominant anion after the inclusion of the salting out agent is the nitrate ion which comprises including in said solution a salting out agent selected from the group consisting of ammonium nitrate and nitrates of divalent and trivalent metals, extracting said solution with a dialkyl ether of a polyethylene glycol, and then washing said dialkyl ether with a liquid selected from the group consisting of water, water containing a dissolved base, and an aqueous ammonium sulfate solution to recover the uranyl nitrate from said dialkyl ether of a polyethylene glycol.

2. A process of separating uranyl nitrate from an aqueous solution also containing at least one other metal in solution and in which the predominant anion after the inclusion of the salting out agent is the nitrate ion which comprises including in said solution a salting out agent selected from the group consisting of ammonium nitrate and nitrates of divalent and trivalent metals, extracting said solution with a dibutyl ether of a polyethylene glycol having the general formula $$C_4H_9(OCH_2CH_2)_n\text{—}OC_4H_9$$

wherein $n$ stands for one of the numbers 2, 3 and 4, and then washing said dibutyl ether of a polyethylene glycol with a liquid selected from the group consisting of water, water containing a dissolved base, and an aqueous ammonium sulfate solution to strip the uranyl nitrate from said dibutyl ether of a polyethylene glycol.

3. A process of separating uranyl nitrate from an aqueous solution also containing iron in solution and in which the predominant anion after the inclusion of the salting out agent is the nitrate ion which comprises including in said solution a salting out agent selected from the group consisting of ammonium nitrate and nitrates of divalent and trivalent metals, extracting said solution with a dibutyl ether of a polyethylene glycol having the general formula:

$$C_4H_9(OCH_2\text{—}CH_2)_n\text{—}OC_4H_9$$

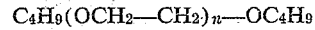

wherein $n$ stands for one of the numbers 2, 3 and 4, washing said polyether phase with an aqueous nitrate solution containing a nitrate selected from the group consisting of ammonium nitrate, calcium nitrate, zinc nitrate, cupric nitrate and aluminum nitrate to remove iron from said polyether phase, and then washing said polyether phase with a liquid selected from the group consisting of water, water containing a dissolved base, and an aqueous ammonium sulfate solution to strip the uranyl nitrate from said dibutyl ether of a polyethylene glycol.

4. A process as set forth in claim 1 in which the extracting step is carried out at a temperature of about 15° C.

5. A process as set forth in claim 2 in which the aqueous solution also contains sulfate ions and ferric nitrate is employed as a salting out agent to complex the sulfate ions and to diminish the adverse effect the sulfate ions have on the distribution of uranyl nitrate into a dibutyl ether of a polyethylene glycol.

6. A process as set forth in claim 1 in which the dialkyl ether of a polyethylene glycol contains added nitric acid dissolved therein to prevent precipitation in the aqueous phase.

7. A process as set forth in claim 3 in which the aqueous nitrate solution used to wash the polyether phase contains an aluminum hydroxide sol dissolved in an aqueous solution of aluminum nitrate.

References Cited in the file of this patent
UNITED STATES PATENTS 2,227,833   Hixson et al. _____ Jan. 7, 1941